United States Patent
Jeon et al.

(10) Patent No.: US 10,853,304 B2
(45) Date of Patent: Dec. 1, 2020

(54) SYSTEM ON CHIP INCLUDING CLOCK MANAGEMENT UNIT AND METHOD OF OPERATING THE SYSTEM ON CHIP

(71) Applicant: Samsung Electronics Co., Ltd., Suwon-si (KR)

(72) Inventors: Ho-yeon Jeon, Hwaseong-si (KR);
Jae-Gon Lee, Yongin-si (KR);
Youn-Sik Choi, Yongin-si (KR);
Min-joung Lee, Suwon-si (KR);
Jin-ook Song, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/533,209

(22) Filed: Aug. 6, 2019

(65) Prior Publication Data

US 2019/0361837 A1    Nov. 28, 2019

Related U.S. Application Data

(63) Continuation of application No. 15/156,825, filed on May 17, 2016, now Pat. No. 10,430,372.

(30) Foreign Application Priority Data

May 26, 2015    (KR) .................. 10-2015-0073091

(51) Int. Cl.
*G06F 13/42*    (2006.01)
*G06F 13/364*    (2006.01)

(52) U.S. Cl.
CPC ........ *G06F 13/4291* (2013.01); *G06F 13/364* (2013.01)

(58) Field of Classification Search
None
See application file for complete search history.

(56) References Cited

U.S. PATENT DOCUMENTS

| 6,192,005 | B1 | 2/2001 | Lee |
| 6,434,704 | B1 | 8/2002 | Dean et al. |
| 6,532,544 | B1 | 3/2003 | Masleid et al. |
| 6,583,648 | B1 | 6/2003 | Cai et al. |

(Continued)

FOREIGN PATENT DOCUMENTS

| CN | 101825917 A | 9/2010 |
| CN | 103477334 A | 12/2013 |

(Continued)

OTHER PUBLICATIONS

Chinese Office Action dated Nov. 27, 2019 issued in corresponding Chinese Patent Application No. 201610362235.4.

(Continued)

*Primary Examiner* — Henry Tsai
*Assistant Examiner* — Aurangzeb Hassan
(74) *Attorney, Agent, or Firm* — Harness, Dickey & Pierce, P.L.C.

(57) ABSTRACT

In one embodiment, the clock management circuitry includes a first master clock controller configured to provide a first command to a first slave clock controller via a first channel based on a received first clock request. The clock management circuitry also includes the first slave clock controller configured to control outputting a first clock signal based on the first command.

20 Claims, 20 Drawing Sheets

(56) References Cited

U.S. PATENT DOCUMENTS

| | | | |
|---|---|---|---|
| 7,007,121 B1 * | 2/2006 | Ansari | G06F 13/364 |
| | | | 710/113 |
| 7,107,476 B2 | 9/2006 | Jeong et al. | |
| 7,743,191 B1 | 6/2010 | Liao | |
| 8,001,411 B2 | 8/2011 | Carey et al. | |
| 8,140,918 B2 | 3/2012 | Kanaya et al. | |
| 8,448,001 B1 | 5/2013 | Zhu et al. | |
| 8,850,091 B1 | 9/2014 | Karamcheti et al. | |
| 8,963,599 B2 | 2/2015 | Dobbs et al. | |
| 9,286,257 B2 | 3/2016 | Hofmann et al. | |
| 9,442,556 B2 | 9/2016 | Joo et al. | |
| 9,571,341 B1 | 2/2017 | Kumar et al. | |
| 2002/0120828 A1 | 8/2002 | Modelski et al. | |
| 2002/0186042 A1 | 12/2002 | Sihlbom et al. | |
| 2006/0200606 A1 | 9/2006 | Kang et al. | |
| 2006/0242348 A1 * | 10/2006 | Humphrey | G06F 13/4291 |
| | | | 710/305 |
| 2006/0242501 A1 | 10/2006 | Kimelman et al. | |
| 2008/0294882 A1 | 11/2008 | Jayapala et al. | |
| 2011/0063103 A1 | 3/2011 | Lee et al. | |
| 2011/0072185 A1 | 3/2011 | Pinto et al. | |
| 2011/0239033 A1 | 9/2011 | Chen | |
| 2011/0271134 A1 | 11/2011 | Hofmann | |
| 2013/0031284 A1 | 1/2013 | Yun et al. | |
| 2013/0117593 A1 | 5/2013 | Nooney et al. | |
| 2013/0124907 A1 | 5/2013 | Aoki | |
| 2013/0124932 A1 | 5/2013 | Schuh et al. | |
| 2014/0071982 A1 | 3/2014 | Chandhoke et al. | |
| 2014/0269854 A1 * | 9/2014 | Wong | G06F 13/4291 |
| | | | 375/219 |
| 2015/0081940 A1 * | 3/2015 | Levy | G06F 13/4291 |
| | | | 710/110 |
| 2015/0149674 A1 * | 5/2015 | Lee | G06F 13/1689 |
| | | | 710/110 |
| 2015/0236870 A1 * | 8/2015 | Lee | G06F 1/324 |
| | | | 370/257 |
| 2015/0242348 A1 * | 8/2015 | Levy | G06F 1/10 |
| | | | 710/110 |
| 2016/0034409 A1 * | 2/2016 | Kim | G06F 13/409 |
| | | | 710/110 |
| 2016/0094337 A1 | 3/2016 | Choi et al. | |
| 2016/0104522 A1 | 4/2016 | Son et al. | |
| 2016/0173416 A1 | 6/2016 | Edmiston et al. | |
| 2016/0239060 A1 * | 8/2016 | Koob | G06F 1/3237 |
| 2016/0352048 A1 | 12/2016 | Lee et al. | |
| 2017/0039162 A1 | 2/2017 | Mishra et al. | |
| 2018/0062919 A1 | 3/2018 | Justin et al. | |
| 2018/0227067 A1 * | 8/2018 | Hu | H04J 3/0641 |

FOREIGN PATENT DOCUMENTS

| | | |
|---|---|---|
| CN | 103777544 A | 5/2014 |
| CN | 105122172 A | 12/2015 |
| JP | 2010021793 A | 1/2010 |
| TW | 453035 B | 9/2001 |
| TW | 200406669 A | 5/2004 |
| TW | 201133248 A | 10/2011 |

OTHER PUBLICATIONS

Taiwanese Office Action dated Apr. 20, 2020 issued in corresponding Taiwanese Patent Application No. 105116190.

* cited by examiner

SYSTEM ON CHIP INCLUDING CLOCK MANAGEMENT UNIT AND METHOD OF OPERATING THE SYSTEM ON CHIP

CROSS-REFERENCE TO RELATED APPLICATION

This application is a continuation of U.S. application Ser. No. 15/156,825 filed on May 17, 2016, which claims the benefit of Korean Patent Application No. 10-2015-0073091, filed on May 26, 2015, in the Korean Intellectual Property Office, the disclosure of each of which is incorporated herein in its entirety by reference.

BACKGROUND

The inventive concepts relates to a system on chip (SoC), and more particularly, to an SoC including a clock management unit and/or a method of operating the SoC.

A system on chip (SoC) is a semiconductor technology for integrating complicated multifunctional systems into a single chip. Intellectual Properties (hereinafter, IPs), which are provided in the SoC, may be designed to be effectively connected to one another through a system bus.

Regarding the SoC, a clock signal may be provided to various functional blocks including the IPs, and the output of the clock signal may be controlled according to a gating operation based on an operating state of the SoC. For example, an interconnect system may be formed to include various functional blocks (e.g., an IP, an asynchronous bridge, a multiplexer, etc.). The SoC may include a clock management unit that manages a clock signal provided to the interconnect system. Since the clock signal relates to the overall performance of the interconnect system, including the speed and power consumption of the SoC, the management of the clock signal requires an efficient clock gating.

SUMMARY

At least one embodiment relates to clock management circuitry.

In one embodiment, the clock management circuitry includes a first master clock controller configured to provide a first command to a first slave clock controller via a first channel based on a received first clock request. The clock management circuitry also includes the first slave clock controller configured to control outputting a first clock signal based on the first command.

At least one embodiment relates to a system on chip.

In one embodiment, the system on chip includes at least first and second hardware components, and clock management circuitry configured to control supply of first and second clocks to the first and second hardware components, respectively. The clock management circuitry includes a first slave clock controller and a first master clock controller. The first master clock controller is configured to control operation of the first slave clock controller and is configured to control supplying the first clock. The first slave clock controller is configured to control supplying the second clock.

At least one embodiment relates to a method of clock management.

In one embodiment, the method includes receiving a clock request; supplying a first command to a first slave clock controller via a first channel based on a received first clock request, the first slave clock controller configured to control outputting a first clock based on the first command; receiving an acknowledgement from the first slave clock controller, the acknowledgement indicating output of the first clock; and supplying a second clock based on the acknowledgement.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
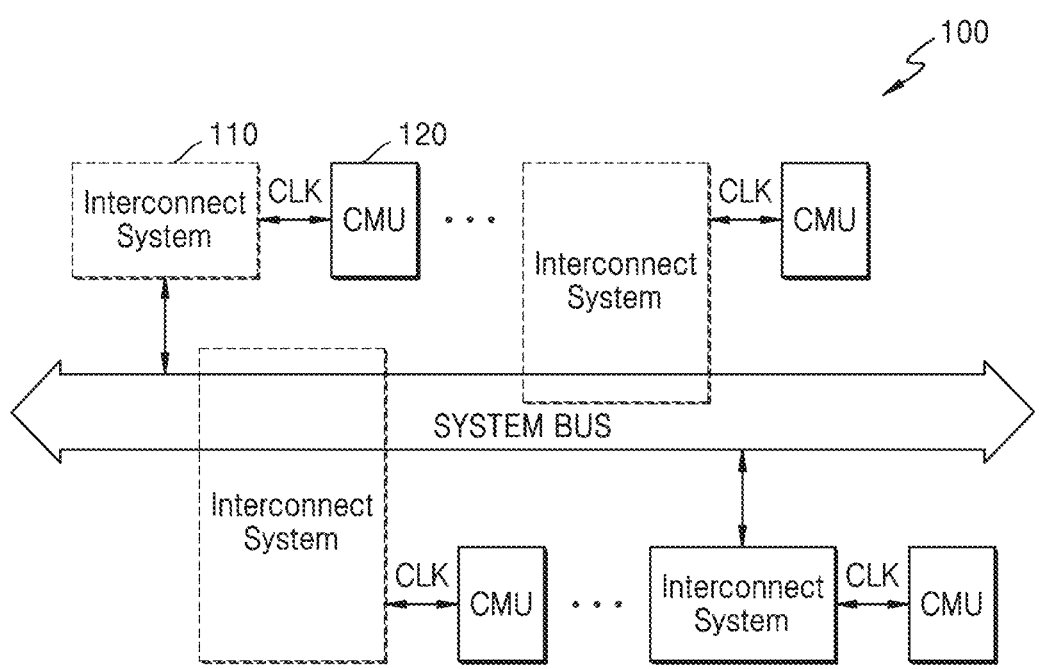
FIG. 1 is a block diagram of a system on chip (SoC) according to an example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

FIG. 1 is a block diagram of a system on chip (SoC) 100 according to an example embodiment of the inventive concepts.

Referring to FIG. 1, the SoC 100 according to the example embodiment of the inventive concepts may include one or more interconnect systems 110 and a clock management device 120 configured to manage a clock signal CLK provided to the one or more interconnect systems 10. The clock management device 120 may be defined as a unit. Accordingly, the clock management device 120 may be referred to as a clock management unit (CMU) 120. The SoC 100 may perform various functions in a semiconductor system. For example, the SoC 100 may be an application processor.

Each of the interconnect systems 110 may include various functional blocks. For example, the interconnect system 110 may include various functional blocks for data communication performed in the SoC 100. The interconnect system 110 may include a master Intellectual Property (IP) and/or a slave IP. In addition, the interconnect system 110 may include various functional blocks, such as a multiplexer and an asynchronous bridge for data communication between the IPs. The SoC may be manufactured into a single chip and be implemented as a package.

In addition, the interconnect system 110 according to the example embodiment of the inventive concepts may further include other various functional blocks. For example, the interconnect system 110 may include at least a part of a system bus. Furthermore, when the SoC 100 has a hierarchical bus structure, the interconnect system 110 may include at least a part of a local data bus. According to some example embodiments, each of the system bus and the local data bus may be defined as a functional block.

The SoC 100 may include various types of IPs. Examples of the IPs may include a processing unit or processor, a plurality of cores included in the processing unit, a multi-format codec (MFC), a video module (e.g., camera interface), a Joint Photographic Experts Group (JPEG) processor, a video processor, a mixer, a 3D graphic core, an audio system, a driver, a display driver, a volatile memory device, a non-volatile memory, a memory controller, an input and output interface block, and a cache memory.

The IPs may be classified into master IPs and slave IPs. A master IP is capable of directly requesting data communication from a slave IP, but the slave IP may perform data communication based on control of the processing unit. For example, some IPs may have both a master function and a slave function. According to some example embodiments, the interconnect system 110 may include one or more master IPs or may include one or more slave IPs. Alternatively, the interconnect system 110 may include both the master IP and the slave IP.

FIG. 1 illustrates a case where the interconnect system 110 includes no system bus, a case where the interconnect system 110 includes a part of the system bus, and a case where the interconnect system 110 includes a functional block for providing data through the system bus and a functional block for receiving data through the system bus. However, as described above, the interconnect system 110 according to the example embodiment of the inventive concepts may be variously defined.

The CMU 120 may provide the clock signal CLK to the interconnect system 110. An example in which one CMU 120 is disposed corresponding to one interconnect system 110 is illustrated in FIG. 1, but the example embodiment of the inventive concepts is not necessarily limited thereto. For example, the CMU 120 may provide the clock signal CLK to some functional blocks of the interconnect system 110, or may provide the clock signal CLK to two or more interconnect systems 110. In addition, the clock signal provided to each of the interconnect systems 110 is indicated by the same reference symbol, but each of the CMUs 120 may provide clock signals CLK having different signal characteristics.

Regarding the connection technologies, a connection method based on a system bus is widely used. For example, with regard to the standard bus specification, an Advanced Microcontroller Bus Architecture (AMBA) protocol of Advanced RISC Machine (ARM) may be used. Bus types of the AMBA protocol may include Advanced High-Performance Bus (AHB), Advanced Peripheral Bus (APB), Advanced eXtensible Interface (AXI), AXI4, and AXI Coherency Extensions (ACE). Of the above-described bus types, the AXI is an interface protocol between IPs and provides a multiple outstanding address function and a data interleaving function. In addition, other types of protocols, such as uNetwork of SONICs Inc. or CoreConnect of IBM, Open Core Protocol of OCP-IP may also be used for the system bus.

Each of the CMUs 120 may generate one or more clock signals CLK. According to an example embodiment, when the clock signal CLK is provided to each of n functional blocks included in the interconnect system 110, the CMU 120 may generate n clock signals CLK and provide the n clock signals to the interconnect system 110. The n clock signals CLK may have different signal characteristics.

In addition, the CMU 120 may be implemented as hardware taking into consideration the configuration of the interconnect system 110. For example, the internal configuration of the CMU 120 may be designed taking into consideration the master/slave configuration of the interconnect system 110. The CMU 120 may include a master clock controller (not illustrated) and a slave clock controller (not illustrated) and may generate a clock signal CLK provided to the interconnect system 110 through a sequential operation control.

According to an example embodiment, the master clock controller may receive a clock request from the IP via hardware or may receive a clock request via software from a processing unit or processor (not illustrated) included in the SoC 100. The master clock controller may control one or more slave clock controllers in response to the clock request. The clock signal CLK, which is generated by the master clock controller and/or the slave clock controller, may be provided to the interconnect system 110.

According to the example embodiment of the inventive concepts, the CMU 120 is implemented based on the configuration of the interconnect system 110 and the clock signal is managed via hardware. Therefore, as compared to a software-based management, it is possible to reduce the probability of occurrence of an error. In addition, as compared to a case where the clock signal is turned on and off by a software coding method, it is possible to appropriately turn the clock signal on and off at a desired time point, thereby achieving a reduction in latency. In addition, power consumption may be reduced by simplifying a structure of a gate unit that generates the clock signal.

Furthermore, since an operating system (OS) and firmware for driving the SoC 100 need not have complicated routines for turning the clock signal on and off with respect to a plurality of functional blocks, the number of software codes and also the load of the CPU may be reduced accordingly.

Figure 2:
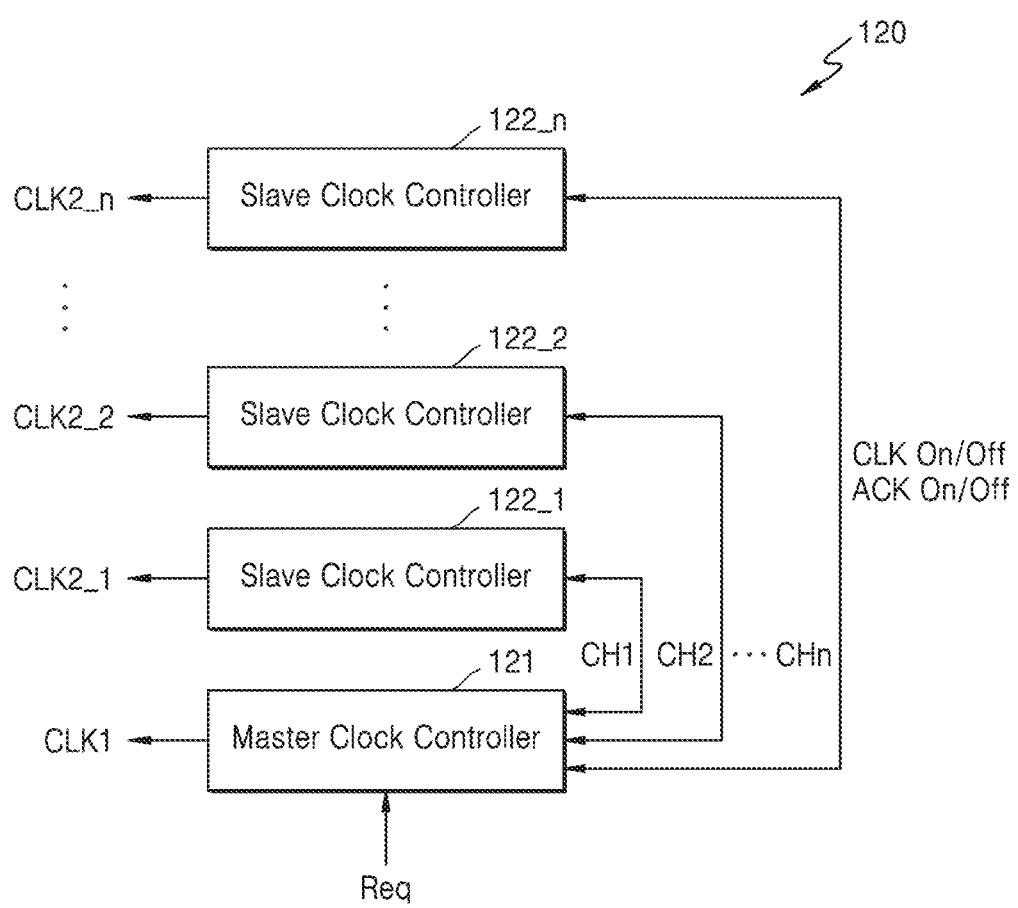
FIG. 2 is a block diagram of a clock management unit of FIG. 1.

FIG. 2 is a block diagram of the CMU 120 of FIG. 1.

Referring to FIG. 2, the CMU 120 may include one master clock controller 121 and n slave clock controllers 122_1 to 122_n. The master clock controller 121 and each of the n slave clock controllers 122_1 to 122_n may be connected to each other through one or more channels for communication with each other. For example, the master clock controller 121 may be connected to the first slave clock controller 122_1 through a first channel CH, may be connected to the second slave clock controller 122_2 through a second channel CH2, and may be connected to the $n^{th}$ slave clock controller 122_n through an $n^{th}$ channel CHn. The master clock controller 121 and each of the n slave clock controllers 122_1 to 122_n may communicate with each other based on a full handshake method.

As the communication between the master clock controller 121 and the slave clock controllers 122_1 to 122_n is performed based on the full handshake method, each of the channels CH1 to CHn may include internal channels for transmitting various types of signals. For example, the first channel CH1 may include a command transfer channel and a response transfer channel. According to an example embodiment, the first channel CH1 may be implemented with a combinational logic cell, thereby minimizing the latency. The second to $n^{th}$ channels CH2 to CHn may also be implemented in an identical or similar manner to the first channel CH1.

According to an example embodiment, the full handshake method may include a Q-channel interface or P-channel interface specification of ARM. In addition, the full handshake method may be performed by various interface methods. For example, an asynchronous communication channel, such as LPI, may be used.

The master clock controller 121 may control the slave clock controllers 122_1 to 122_n in response to a clock request Req. The master clock controller 121 may provide a clock on/off command CLK On/Off to the slave clock controllers 122_1 to 122_n in response to the clock request Req. Each of the slave clock controllers 122_1 to 122_n may perform a clock gating in response to the clock on/off command CLK On/Off and provide a clock acknowledgement ACK On/Off to the master clock controller 121. If the clock request Req provided to the master clock controller 121 is a request to provide a corresponding functional block with a clock signal CLK1, the master clock controller 121 provides the slave clock controllers 122_1 to 122_n with the clock on command CLK On and the slave clock controllers 122_1 to 122_n may provide the master clock controller 121 with the clock acknowledgement ACK ON indicating that clock signals CLK2_1 to CLK2_n have been output.

For example, the master clock controller 121 may provide the first slave clock controller 122_1 with the clock on/off command CLK On/Off in response to the clock request Req. The first slave clock controller 122_1 may perform the clock gating in response to the clock on/off command CLK On/Off and provide the master clock controller 121 with the clock acknowledgement ACK On/Off indicating that the clock gating has been completed.

When the master clock controller 121 receives the clock acknowledgement ACK On/Off from the first slave clock controller 122_1, the master clock controller 121 may provide the second slave clock controller 122_2 with the clock on/off command CLK On/Off. The second slave clock controller 122_2 may perform the clock gating in response to the clock on/off command CLK On/Off and provide the master clock controller 121 with the clock acknowledgement ACK On/Off.

Similarly, the master clock controller 121 may provide the other slave clock controllers 122_3 to 122_n with the clock on/off command CLK On/Off. In addition, the master clock controller 121 may sequentially receive the clock acknowledgement ACK On/Off from the other slave clock controllers 122_3 to 122_n.

According to an example embodiment, the order in which the slave clock controllers 122_1 to 122_n output the clock signals CLK2_1 to CLK2_n may be variously set. For example, after the $n^{th}$ slave clock controller 122_n outputs the clock signal CLK2_n, the first slave clock controller 122_1 may output the clock signal CLK2_1. Alternatively, after some of the slave clock controllers 122_1 to 122_n output the clock signals, the master clock controller 121 may output the clock signal CLK1. After all of the slave clock controllers 122_1 to 122_n respectively output the clock signals CLK2_1 to CLK2_n, the master clock controller 121 may output the clock signal CLK1.

The master clock controller 121 may enable or disable the clock signal CLK1 at various time points. If the clock request Req is a request to provide the clock signal CLK1 to the functional block, the master clock controller 121 may output the clock signal CLK1 after receiving the clock acknowledgement ACK On/Off from the slave clock controllers 122_1 to 122_n. In this manner, the functional block (e.g., the master IP), which is to perform data communication, may receive the clock signal CLK1 after the interconnect system completes the clock setting with respect to all of the functional blocks.

In addition, if the clock request Req is a request to block the providing of the clock signal CLK1 to the functional block, the master clock controller 121 may provide the clock on/off command CLK On/Off after blocking the output of the clock signal CLK1. In this manner, after the clock signal CLK1 for the functional block (e.g., the master IP) having completed the data communication is disabled, the clock signals CLK2_1 to CLK2_n for the other functional blocks are disabled. The order of disabling the clock signals CLK2_1 to CLK2_n for the other functional blocks may be variously set.

On the other hand, each of the clock controllers included in the CMU 120 may include various functions related to the clock processing. For example, each of the clock controllers may include various types of circuits configured to receive a source clock and process the received source clock to generate operating clocks used in the functional blocks. According to an example embodiment, each of the clock controllers may include at least one selected from among an oscillator, a phase-locked loop, a multiplexer, a divider, and a gate. Alternatively, each of the clock controllers may include a unit configured to process other types of signals. The selections and variations described above are a matter of design choice.

For convenience of description, the clock signals output from the master clock controller and the slave clock controller are denoted with the same reference symbol CLK, but the characteristics of the clock signals may be variously changed as described above.

Figure 3A:
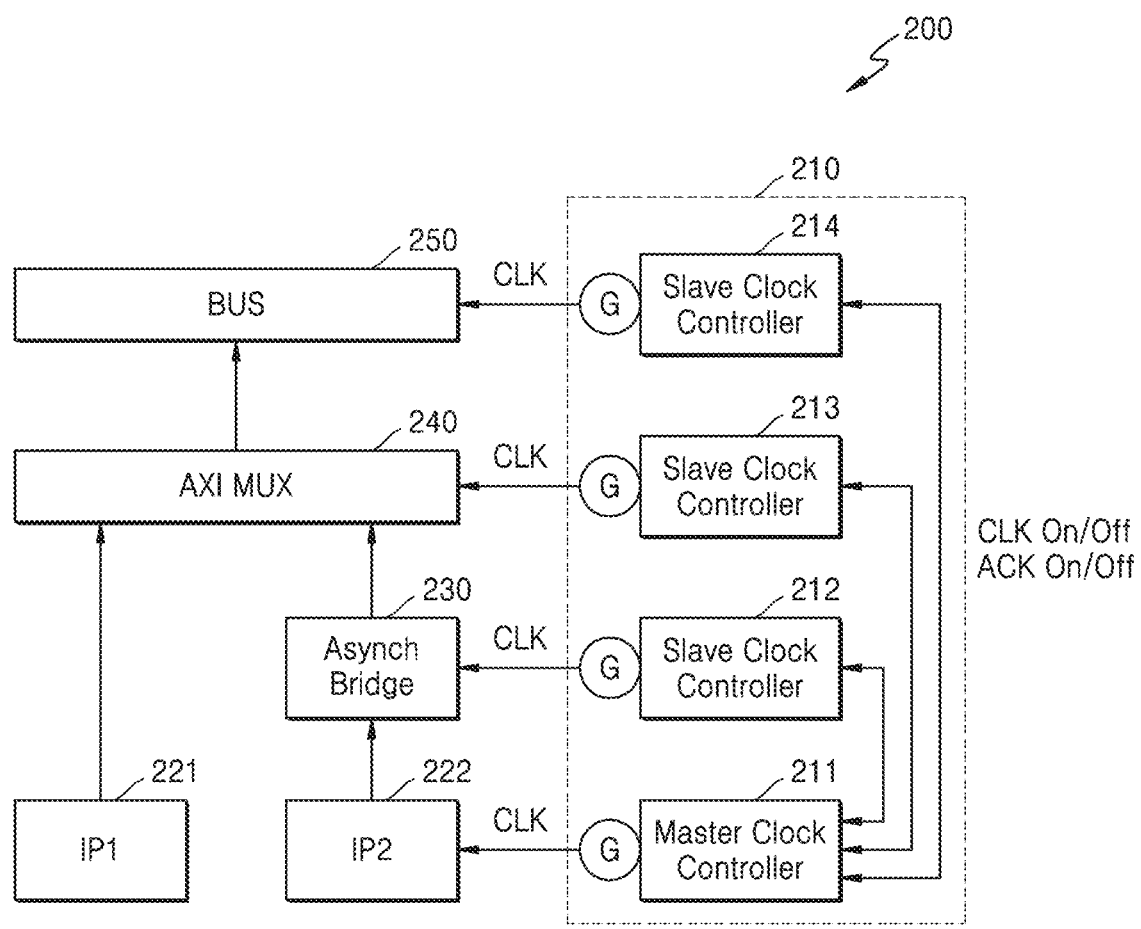
FIGS. 3A and 3B are block diagrams of an SoC according to an example embodiment of the inventive concepts.
Figure 3B:
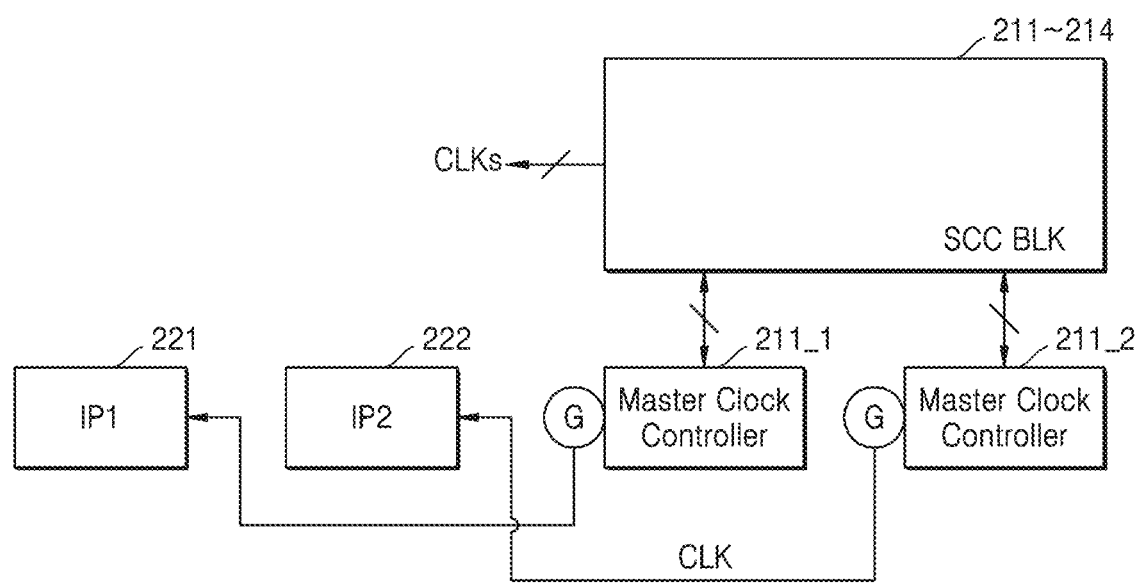

FIGS. 3A and 3B are block diagrams of an SoC 200 according to an example embodiment of the inventive concepts. As illustrated in FIG. 3A, the SoC 200 may include a CMU 210 and various functional blocks or hardware components. In FIG. 3A, first and second IPs 221 and 222, an asynchronous bridge 230, a multiplexer 240, and a bus 250 are illustrated as the functional blocks or hardware components that receive clock signals CLK from the CMU 210.

The asynchronous bridge 230 may be provided to exchange data between functional blocks using different operating frequencies. The multiplexer 240 may support a bus selected from among bus types based on various protocols. In FIG. 3A, an AXI multiplexer 240 is illustrated as the multiplexer 240. The bus 250 may correspond to a system bus or other bus (e.g., a local bus). If the bus 250 corresponds to the local bus, signals from the first and second IPs 221 and 222 may be provided to a system bus (not illustrated) through the bus 250.

At least some of the first and second IPs 221 and 222, the asynchronous bridge 230, the multiplexer 240, and the bus 250 may constitute the above-described interconnect system. In addition, the CMU 210 may include a master clock controller 211 and first to third slave clock controllers 212 to 214 so as to correspond to the interconnect system. Furthermore, for convenience of description, gate units that perform clock gating are separately illustrated, but the gate units G may be provided inside the corresponding clock controllers. On the other hand, the gate units G may be variously implemented and may include, for example, one or more logic devices (not illustrated). According to an example embodiment, the enabling or disabling of a clock signal CLK may be controlled based on signal processing using logic devices, such as a flip flop or an AND gate.

FIG. 3A illustrates an example of a case in which the CMU 210 includes only one master clock controller 211. In this case, the master clock controller 211 may be connected to both the first and second IPs 221 and 222. However, FIG. 3A illustrates an example in which the clock signal CLK from the master clock controller 211 is provided to the second IP 222. According to another example embodiment, as illustrated in FIG. 3B, the CMU 210 may include two master clock controllers 211_1 and 211_2 respectively corresponding to the first and second IPs 221 and 222. For convenience of description, a slave clock controller block SCC BLK including a plurality of slave clock controllers is illustrated in FIG. 3B. Each of the master clock controllers 211_1 and 211_2 may communicate with the slave clock controller block SCC BLK through separate channels.

Referring again to FIG. 3A, the functional blocks provided in the interconnect system may be divided into master functional blocks and slave functional blocks. Of the functional blocks provided in the interconnect system, a functional block (e.g., a master IP and/or a slave IP) that generates data traffic may correspond to the master functional block. The other functional blocks downstream in the data traffic flow may correspond to the slave functional blocks. Namely, the direction of data flow may be referred to as downstream, and the direction opposite of the data flow direction may be referred to as upstream.

As another example, a functional block in which data traffic substantially starts may correspond to the master functional block. In FIG. 3A, the asynchronous bridge 230 is defined as the slave functional block. However, data traffic may be started in the process of providing data from the second IP 222 downstream to the multiplexer 240. Accordingly, the asynchronous bridge 230 may be defined as the master functional block. In addition, the functional blocks provided in the interconnect system may be divided into master functional blocks and slave functional blocks according to various definition methods.

On the other hand, each of a plurality of clock controllers provided in the CMU 210 may be designed corresponding to the configuration of the interconnect system via hardware. For example, the master clock controller and the slave clock controller of the CMU 210 may be defined corresponding to the functional blocks of the interconnect system. For example, as illustrated in FIG. 3A or 3B, the clock controller that provides the clock signal CLK to the first and second IPs 221 and 222 may correspond to the master clock controller 211, and the other clock controllers may correspond to the slave clock controllers 212, 213, and 214.

If the operating clock is provided to the second IP 222, when the clock request (not shown) is provided to the CMU 210 (e.g., provided by a host, CPU, etc.), the master clock controller 211 provides the clock on/off command CLK On/Off to the third slave clock controller 214. The clock on/off command CLK On/Off may include clock on information indicating the output of the clock signal CLK to the functional block. The third slave clock controller 214 may perform the clock gating in response to the clock on/off command CLK On/Off, provide the bus 250 with the clock signal CLK, and provides the master clock controller 211 with the clock acknowledgement ACK On/Off indicating that the clock gating has been completed.

Similarly, the master clock controller 211 may sequentially provide the second slave clock controller 213 with the clock on/off command CLK On/Off, and the second slave clock controller 213 may provide the multiplexer 240 with the clock signal CLK. In addition, the second slave clock controller 213 may provide the master clock controller 211 with the clock acknowledgement ACK On/Off.

Furthermore, the master clock controller 211 may sequentially provide the first slave clock controller 212 with the clock on/off command CLK On/Off, and the first slave clock controller 212 may provide the asynchronous bridge 230 with the clock signal CLK. Moreover, the first slave clock controller 212 may provide the master clock controller 211 with the clock acknowledgement ACK On/Off.

When the master clock controller 211 receives the clock acknowledgement ACK On/Off from all of the slave clock controller 212 to 214, the master clock controller 121 may perform the clock gating by controlling the gate unit G provided in the master clock controller 211. Accordingly, the clock signal CLK may be provided to the second IP 222.

According to the example embodiment, the master clock controller 211 may communicate with the slave clock controllers 212 to 214 through the channel based on the handshake method. The master clock controller 211 may check whether each of the slave clock controllers 212 to 214 normally outputs the clock signal CLK. After the clock setting of the interconnect system is completed, it is possible to provide the clock signal CLK to the second IP 222, thus improving the operation stability of the interconnect system.

Figure 4:
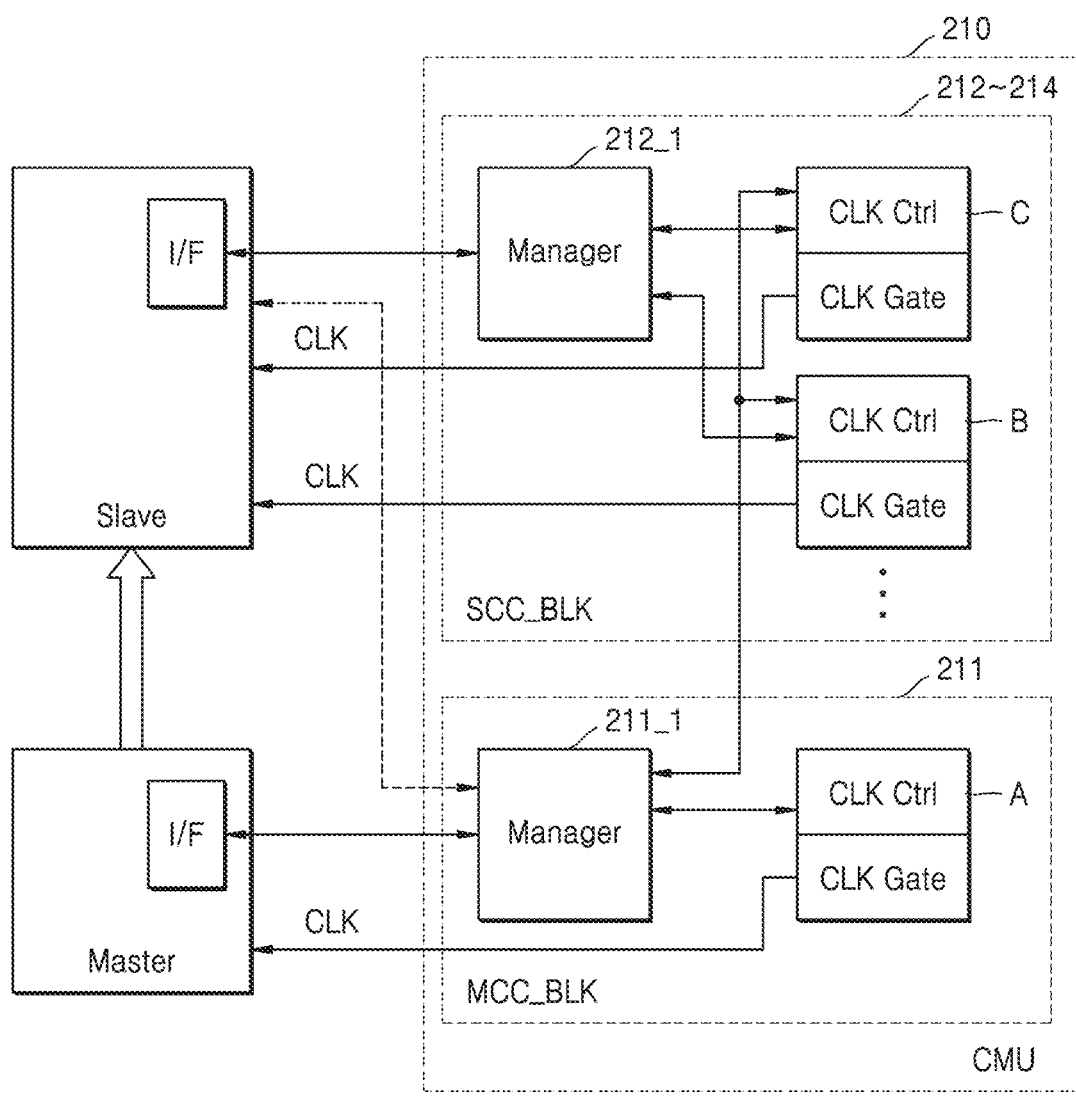
FIG. 4 is a block diagram of a master clock controller and a slave clock controller of FIG. 3, according to an example embodiment of the inventive concepts.

FIG. 4 is a block diagram of the master clock controller 211 and a slave clock controller 212 of FIG. 3, according to an example embodiment of the inventive concepts. In order to describe the operation of the CMU 210, both the master functional block and the slave functional block are illustrated in FIG. 4. One master functional block and one slave functional block are illustrated in FIG. 4, but in practice, the blocks of FIG. 4 may correspond to a plurality of master functional blocks and a plurality of slave functional blocks.

Referring to FIGS. 3 and 4, since the CMU 210 includes one or more master clock controllers 211 and one or more slave clock controllers 212 to 214, a master clock controller block MCC_BLK and a slave clock controller block SCC_BLK may be defined. The slave clock controller block SCC_BLK of FIG. 4 may include the first to third slave clock controllers 212 to 214 of FIG. 3. For example, a manager 212_1 that controls the overall operations of the slave clock controller may be included in only one of the slave clock controllers. The manager 212_1 may be provided in each of the slave clock controllers 212 to 214.

The master clock controller 211 may include a manager 211_1 that controls the overall operations of the clock management. In addition, the master clock controller 211 may include a clock source A including one or more gate units (CLK Gate) and a clock control unit (CLK Ctrl) for gating control. Similarly, each of the slave clock controllers 212 to 214 may include clock sources B and C each including a gate unit and a clock control unit. The clock gating unit may be a simple gate structure such as a gate receiving the clock source signal and an enable signal from the clock control unit. The clock control unit may be a hardware circuit designed to implement a desired state machine. As will be appreciated hardware circuits implementing state machines are well-known, and a matter of design choice.

As described above, various functions related to clock signal processing may be included in each of the clock sources A, B, and C. According to an example embodiment, each of the clock sources A, B, and C may include at least one selected from among an oscillator, a phase-locked loop, a multiplexer, a divider, and a gate. As will be readily appreciated, clock sources are well-known, and the structure thereof is a matter of design choice.

On the other hand, each of the master functional block and the slave functional block may include an interface (I/F) configured to communicate with the CMU 210. According to another example embodiment, the slave functional block may not include the interface (I/F) configured to communicate with the CMU 210. In order to receive the clock signal CLK, the master functional block may transmit the clock request to the master clock controller 211 through the interface. The manager 211_1 of the master clock controller 211 may provide the clock on/off command CLK On/Off to the slave clock controllers 212 to 214 in response to the clock request. The clock sources B and C of the slave clock controllers 212 to 214 may enable the clock signals CLK and output the clocks CLK, and information (e.g., clock acknowledgement) indicating the output of the clocks CLK may be provided to the manager 211_1 of the master clock controller 211.

According to an example embodiment, each of the clock sources B and C of the slave clock controllers 212 to 214 may provide the manager 212_1 of the slave clock controller block SCC_BLK with information indicating that the clock signal CLK has been enabled. In addition, the interface of the slave functional block may further include a function of communicating with the manager 211_1 of the master clock controller 211.

Figure 5:
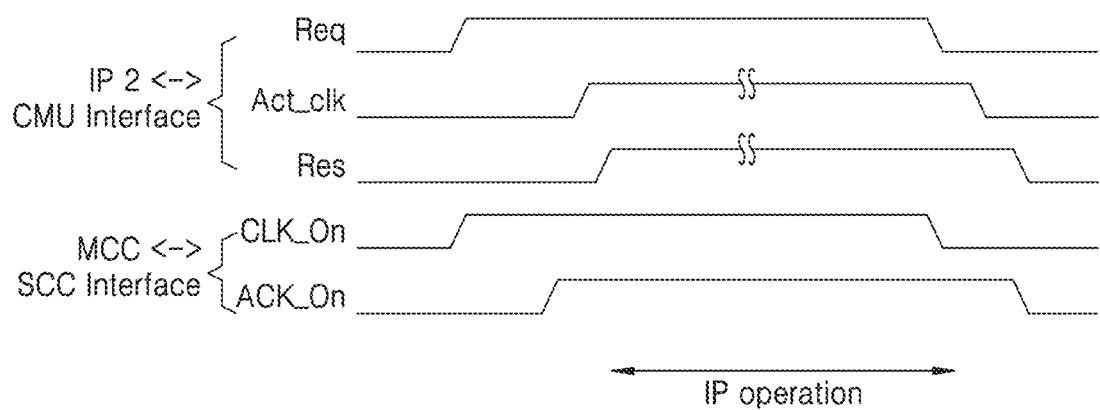
FIG. 5 is a waveform diagram for describing an operation of a clock management unit of FIG. 4, according to an example embodiment of the inventive concepts.

FIG. 5 is a waveform diagram for describing the operation of the CMU 210 of FIG. 4, according to an example embodiment of the inventive concepts. Specifically, FIG. 5 illustrates an example of the interface signalling between the second IP 222 and the CMU 210 and the interface signalling between the master clock controller MCC and the slave clock controller SCC.

Referring to FIG. 5, when the enabled clock request Req is provided to the master clock controller MCC, the master clock controller MCC enables (or generates) the clock on command CLK On and provides the enabled clock on command CLK On to the slave clock controller SCC. The slave clock controller SCC outputs the clock signal CLK, enables the clock acknowledgement ACK_On indicating the output of the clock signal CLK, and provides the enabled clock acknowledgement ACK_On to the master clock controller MCC.

The master clock controller MCC enables the clock enable signal Act_clk for controlling the gate unit in response to the clock acknowledgement ACK_On, and outputs the clock signal CLK to the second IP 222. In addition, in response to the clock request Req, the master clock controller MCC may optionally provide the request response Res indicating that the providing of the clock signal CLK has been completed. These enable signals are disabled in the same manner as shown in FIG. 5.

Figure 6:
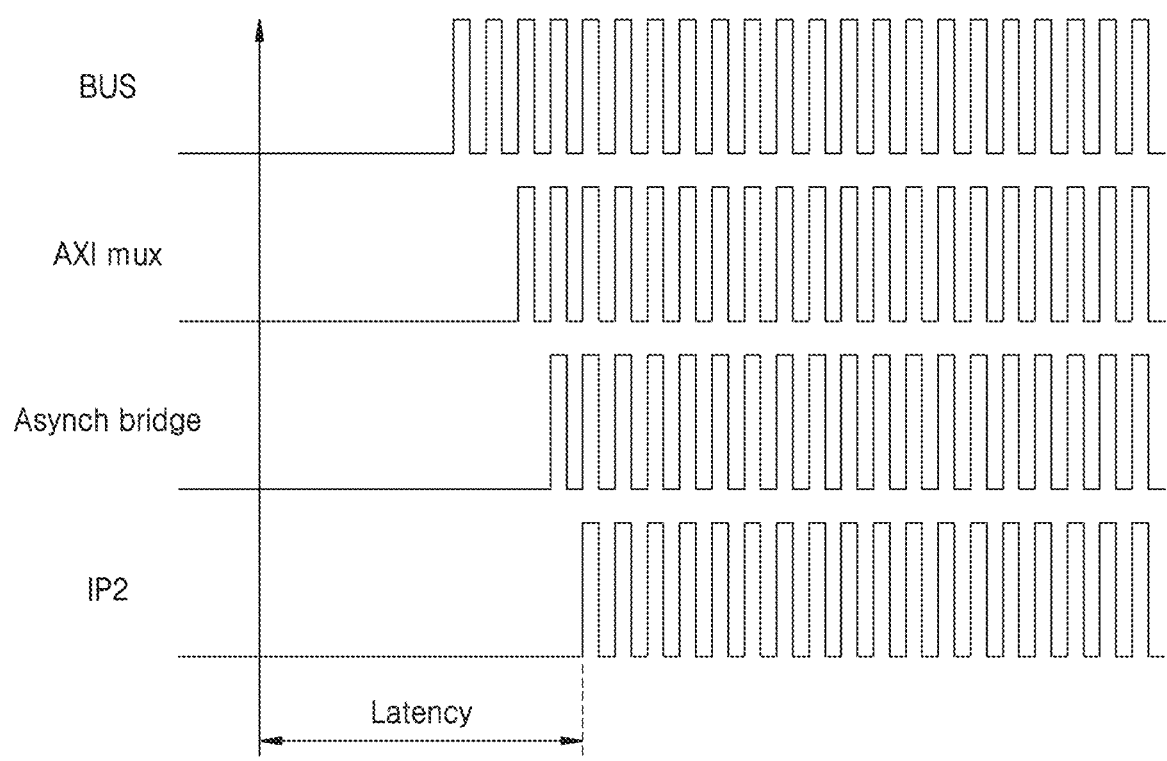
FIG. 6 is a waveform diagram of clock signals output from a clock management unit of FIG. 3, according to an example embodiment of the inventive concepts.

FIG. 6 is a waveform diagram of clock signals output from the CMU 210 of FIG. 3, according to an example embodiment of the inventive concepts. Specifically, FIG. 6 is a waveform diagram for a case when the clock signal CLK is provided to the second IP 222.

Referring to FIGS. 3 and 6, the master clock controller 211 sequentially provides the clock on/off command CLK On/Off to the slave clock controllers 212 to 214. As an example, since the third slave clock controller 214 first performs the clock gating, the clock signal CLK is first provided to the bus 250. Subsequently, the second slave clock controller 213 provides the clock signal CLK to the multiplexer 240 and the first slave clock controller 212 provides the clock signal CLK to the asynchronous bridge 230. Finally, the master clock controller 211 provides the clock signal CLK to the second IP 222.

Since the clock controllers of the CMU 210 are controlled via hardware, the delay for the on/off processing of the clock signal CLK and the latency for providing the clock signal CLK to the second IP 222 may be reduced.

On the other hand, an example in which the clock signal CLK is sequentially output in the order from the third slave clock controller 214 to the first slave clock controller 212 is illustrated in FIG. 6, but the inventive concepts are not necessarily limited thereto. The order in which the slave clock controllers 212, 213, and 214 output the clock signals CLK may be variously changed. After all of the slave clock controllers 212, 213, and 214 output the clock signals CLK, the master clock controller 211 may output the clock signal CLK.

As another example, if the providing of the clock signal CLK to the second IP 222 is blocked, the master clock controller 211 may first disable the first clock signal CLK in response to the clock request. Then, the slave clock controllers 212, 213, and 214 may disable the clock signal CLK in any order.

Furthermore, while FIG. 6, and FIG. 3A, show the same clock CLK supplied to different components, in alternative embodiments, different clock signals may be supplied to different components.

Figure 7:
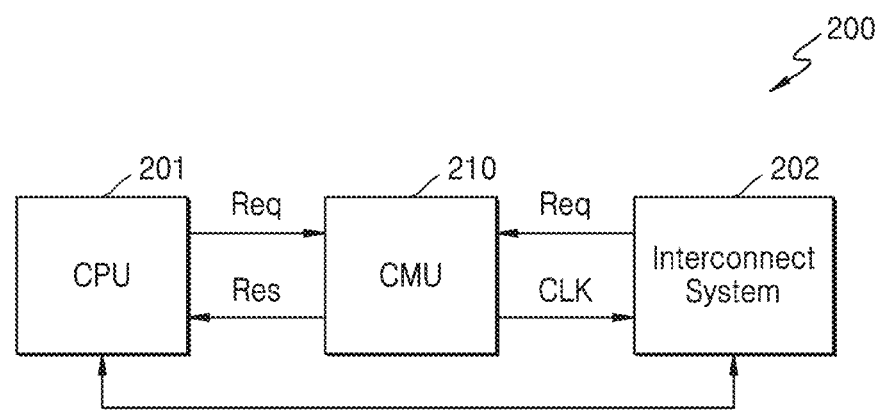
FIG. 7 is a block diagram for describing signals used by a clock management unit, according to an example embodiment of the inventive concepts.

FIG. 7 is a block diagram for describing signals used in a CMU 210, according to an example embodiment of the inventive concepts.

Referring to FIG. 7, an SoC 200 may include the CMU 210, a central processing unit (CPU) 201, and an interconnect system 202. In addition, the interconnect system 202 may include at least some of the functional blocks illustrated in FIG. 3. The CMU 210 may receive a clock request Req from the CPU 201 via software, receive a clock request Req from the interconnect system 202 via hardware, and perform a control operation of a clock signal CLK based on a handshake communication method between a plurality of clock controllers provided therein. The CMU 210 may provide one or more generated clock signals CLK to the interconnect system 202.

The CPU 201 may control the overall operation of the SoC 200 via software by executing various codes. For example, the CPU 201 may perform a control operation to provide the clock signal CLK to the IPs. The CMU 210 may provide the CPU 201 with the a request response Res indicating that the clock signal CLK has been provided to each functional block of the interconnect system 202. By receiving the request response Res, the CPU 201 may determine that a clock setting for the interconnect system 202 has been completed and may control the IPs based on a determination result.

Figure 8:
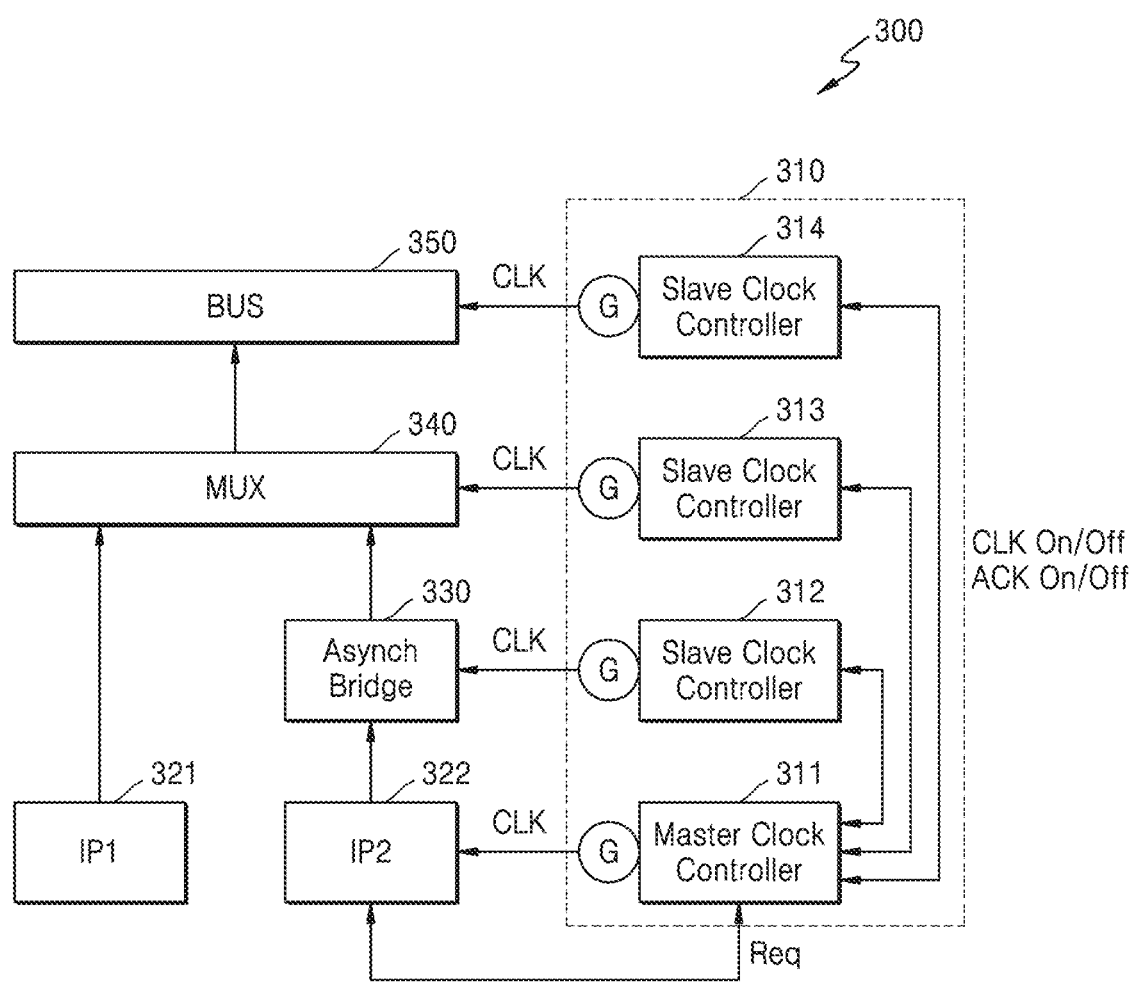
FIG. 8 is a block diagram of an SoC according to another example embodiment of the inventive concepts.

FIG. 8 is a block diagram of an SoC 300 according to another example embodiment of the inventive concepts.

Referring to FIG. 8, the SoC 300 may include a CMU 310 and various functional blocks. In FIG. 8, first and second IPs 321 and 322, an asynchronous bridge 330, a multiplexer 340, and a bus 350 are illustrated as the functional blocks that receive a clock signal CLK from the CMU 310. Since the operations of the plurality of functional blocks constituting an interconnect system in FIG. 8 are identical or similar to those of the above-described embodiments, detailed descriptions thereof will be omitted.

The CMU 310 may include one or more master clock controller and one or more slave clock controllers. According to an example embodiment, the CMU 310 may include a master clock controller 311 and first to third slave clock controllers 312 to 314. The master clock controller 311 and each of the slave clock controllers 312 to 314 may be connected to each other through a channel and communicate with each other based on a handshake method. In addition, at least one of the functional blocks constituting the interconnect system may be connected to the master clock controller 311 or the slave clock controllers 312 to 314. In FIG. 8, the second IP 322 and the master clock controller 311 may be connected to each other through separate channels and communicate with each other.

According to the example embodiment illustrated in FIG. 8, the clock request Req provided to the master clock controller 311 may be generated by the second IP 322, and the second IP 322 may provide the clock request Req to the master clock controller 311 via hardware. That is, the second IP 322 and the CMU 310 may perform communication through an individual protocol. Thus, the CMU 310 may be controlled based on a fully hardware method. In this case, the clock gating may be controlled via hardware, without use of software.

As described above, the master clock controller 311 that received the clock request Req may sequentially communicate with the plurality of slave clock controllers 312 to 314. For example, the master clock controller 311 may provide the clock on/off command CLK On/Off to each of the slave clock controllers 312 to 314 and may receive the clock acknowledgement ACK On/Off from each of the slave clock controllers 312 to 314.

Figure 9A:
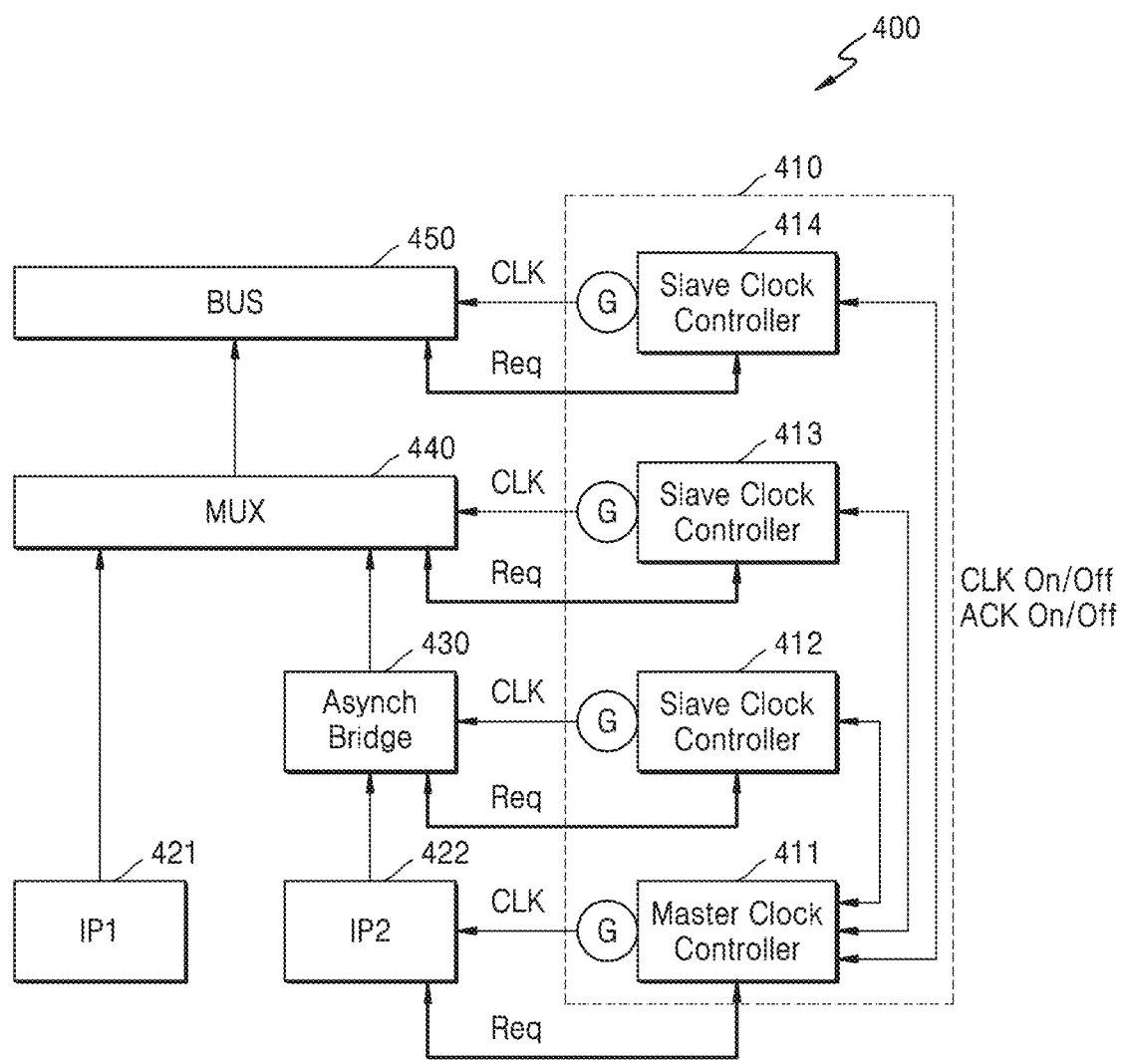
FIG. 9A is a block diagram of an SoC according to another example embodiment of the inventive concepts.

FIG. 9A is a block diagram of an SoC 400 according to another example embodiment of the inventive concepts.

Referring to FIG. 9A, the SoC 400 may include a CMU 410, and first and second IPs 421 and 422, an asynchronous bridge 430, a multiplexer 440, and a bus 450 as the functional blocks that receive a clock signal CLK from the CMU 410. Since the operation of the CMU 410 and the operations of the plurality of functional blocks constituting an interconnect system in FIG. 9A may be identical or may be similar to those of the above-described embodiments, detailed descriptions thereof will be omitted.

According to the example embodiment of FIG. 9A, the plurality of functional blocks constituting the interconnect system may be connected to the CMU 410 through separate channels. In addition, each of the functional blocks may include a unit configured to generate a clock request Req. For example, a control unit, such as a state machine, may be provided in each of the functional blocks.

The second IP 422 may be connected to the master clock controller 411 to provide the clock request Req to the master clock controller 411. Similarly, the asynchronous bridge 430 may be connected to the first slave clock controller 412 to provide the clock request Req to the first slave clock controller 412. The multiplexer 440 may be connected to the second slave clock controller 413 to provide the clock request Req to the second slave clock controller 413. In addition, the bus 450 may be connected to the third slave clock controller 414 to provide the clock request Req to the third slave clock controller 414.

The master clock controller 411 and each of the first to third slave clock controllers 412 to 414 may generate the clock signals CLK in response to the clock request Req. According to an example embodiment, each of the first to third slave clock controllers 412 to 414 may generate the clock signal CLK and provide the clock acknowledgement ACK On/Off to the master clock controller 411. The second IP 422 may receive the clock signal CLK after the clock signals CLK are all provided to the other functional blocks constituting the interconnect system. According to an example embodiment, after receiving the clock acknowledgement ACK On/Off from the first to third slave clock controllers 412 to 414, the master clock controller 411 may perform the clock gating to provide the clock signal CLK to the second IP 422.

The CMU 410 may operate according to various methods according to the configuration illustrated in the example embodiment of FIG. 9. For example, the master clock controller 411 may provide the clock on/off command CLK On/Off to the first to third slave clock controllers 412 to 414 in response to the clock request Req. On the other hand, since each of the first to third slave clock controllers 412 to 414 receives the clock request Req from the corresponding functional block, the clock on/off command CLK On/Off provided from the master clock controller 411 may be ignored.

Alternatively, even when the providing of the clock signal CLK to the second IP 422 is blocked in response to the clock off command, at least some of the other functional blocks may maintain the reception of the clock signal CLK. The bus 450 may include a space (e.g., FIFO) for temporarily storing data therein. Even when the operation of the second IP 422 is completed, the operating state of the bus 450 is maintained. At this time, the third slave clock controller 414 may ignore the clock off command provided from the master clock controller 411 and provide the clock signal CLK to the bus 450. According to an example embodiment, the third slave clock controller 414 may block the outputting of the clock signal CLK in response to the clock request (e.g., the clock off command) provided from the bus 450.

The communication method using the channel between the functional blocks and the clock controllers illustrated in FIGS. 8 and 9A may be variously implemented. For example, as the full handshake method, a Q-channel interface or P-channel interface specification of ARM may be used.

Figure 9B:
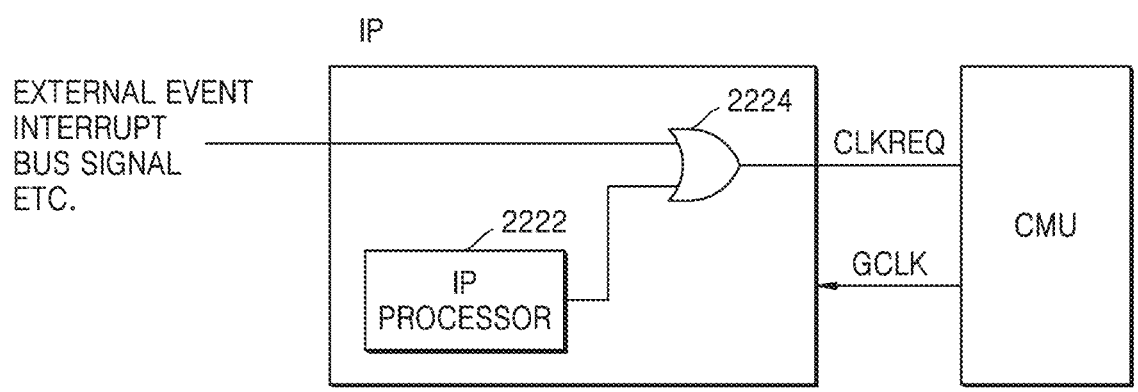
FIG. 9B illustrates an example of the second IP.

FIG. 9B illustrates an example of the second IP in FIG. 9A. As shown, the second IP includes one or more IP processors 2222. The processor 2222 according to the functionality by executed selectively generates a clock request signal. As described previously, the second IP may be, for example, a camera interface. When the camera interface is activated, then the IP processor 2222 may generate the clock request signal. An OR gate 2224 may receive the clock request output from the IP processor 2222, and may receive an external clock request signal (e.g., external event, interrupt, bus signal, wake-up signal, etc.). The output of the OR gate 2224 serves as the clock request signal to the CMU.

Figure 10:
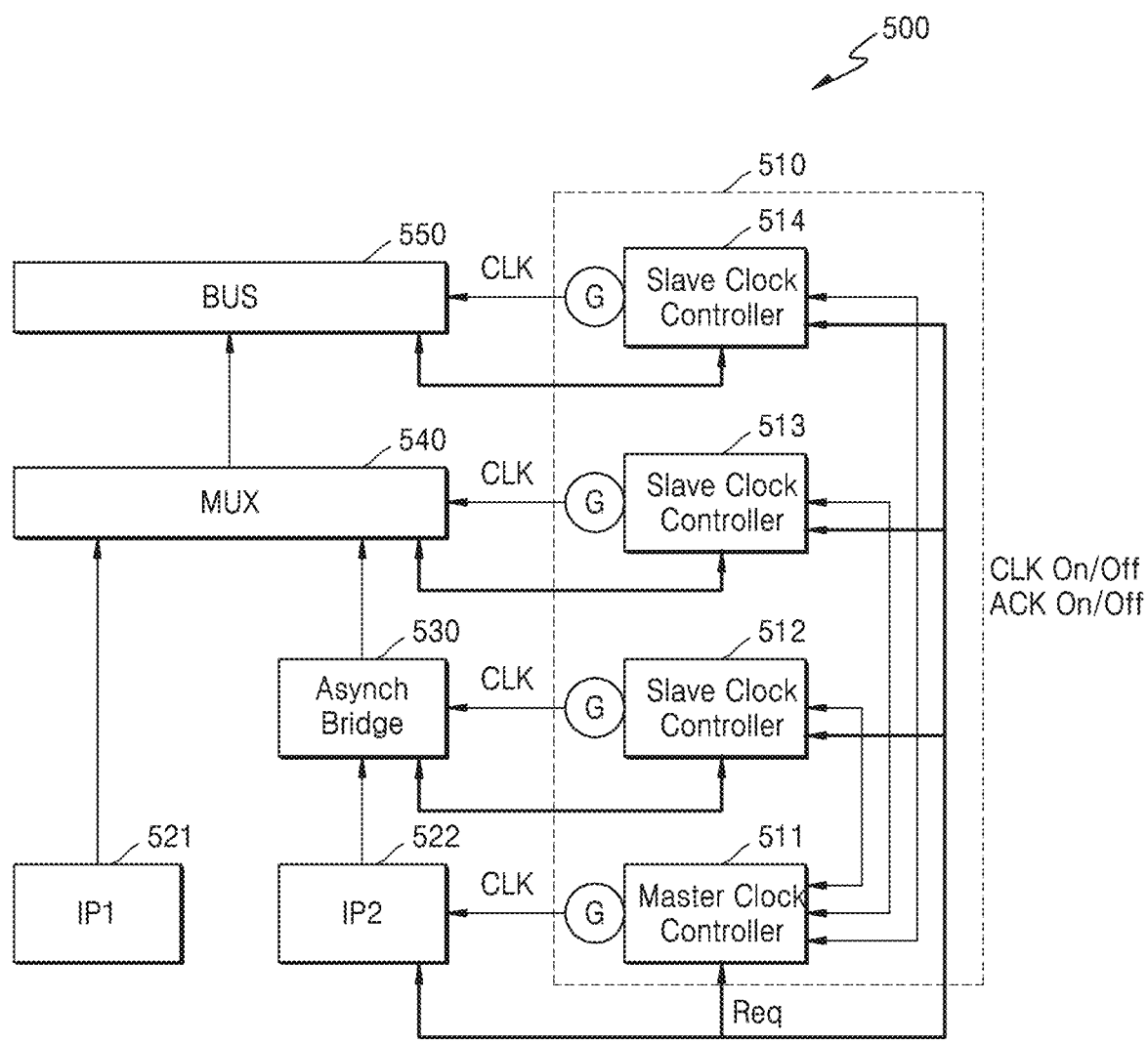
FIG. 10 is a block diagram of an SoC according to another example embodiment of the inventive concepts.

FIG. 10 is a block diagram of an SoC 500 according to another example embodiment of the inventive concepts. Specifically, FIG. 10 illustrates an example in which signals for communication between a master clock controller 511 and functional blocks are provided to slave clock controllers 512 to 514.

Referring to FIG. 10, the SoC 500 may include a CMU 510, and first and second IPs 521 and 522, an asynchronous bridge 530, a multiplexer 540, and a bus 550 as the functional blocks that receive a clock signal CLK from the CMU 510. Since the operation of the CMU 510 and the operations of the plurality of functional blocks constituting an interconnect system in FIG. 10 are identical or substantially similar to those of the above-described embodiments, detailed descriptions thereof will be omitted.

As described above, the master clock controller 511 may communicate with the first to third slave clock controllers 512 to 514 through a channel. In addition, as illustrated in FIG. 10, the functional blocks constituting the interconnect system may communicate with the corresponding clock controllers via separate channels. According to another example embodiment, the channels disposed between the functional blocks and the slave clock controllers 512 to 514 in FIG. 10 may be removed.

One of the functional blocks constituting the interconnect system, for example, the second IP 522 may be connected to the master clock controller 411 through a separate channel and may be connected to the slave clock controller through the same channel or a different channel. According to an example embodiment, the second IP 522 may be connected to the first to third slave clock controllers 512 to 514. A clock request Req from the second IP 522 may be provided to the master clock controller 511 through the channel. In addition, the clock request Req may be provided to the first to third slave clock controllers 512 to 514.

When the clock request Req is received from the second IP 522, each of the first to third slave clock controllers 512 to 514 may determine that the second IP 522 is to receive the clock signal CLK. Each of the first to third slave clock controllers 512 to 514 may perform the clock gating in response to the clock request Req, generate the clock signal CLK, and provide the clock signal CLK to the corresponding functional block. In an identical or similar manner to the above-described embodiments, the operation of generating the clock signal (or a timing at which the clock signal CLK is provided to the functional blocks) may be controlled to be sequentially performed. For example, after the third slave clock controller 514 performs the clock gating, the second slave clock controller 513 performs the clock gating, and then, the first slave clock controller 512 may perform the clock gating.

Each of the first to third slave clock controllers 512 to 514 may provide the clock acknowledgement ACK On/Off to the master clock controller 511. When the clock acknowledgement ACK On/Off is received, the master clock controller 511 may perform the clock gating to provide the clock signal CLK to the second IP 522.

Figure 11:
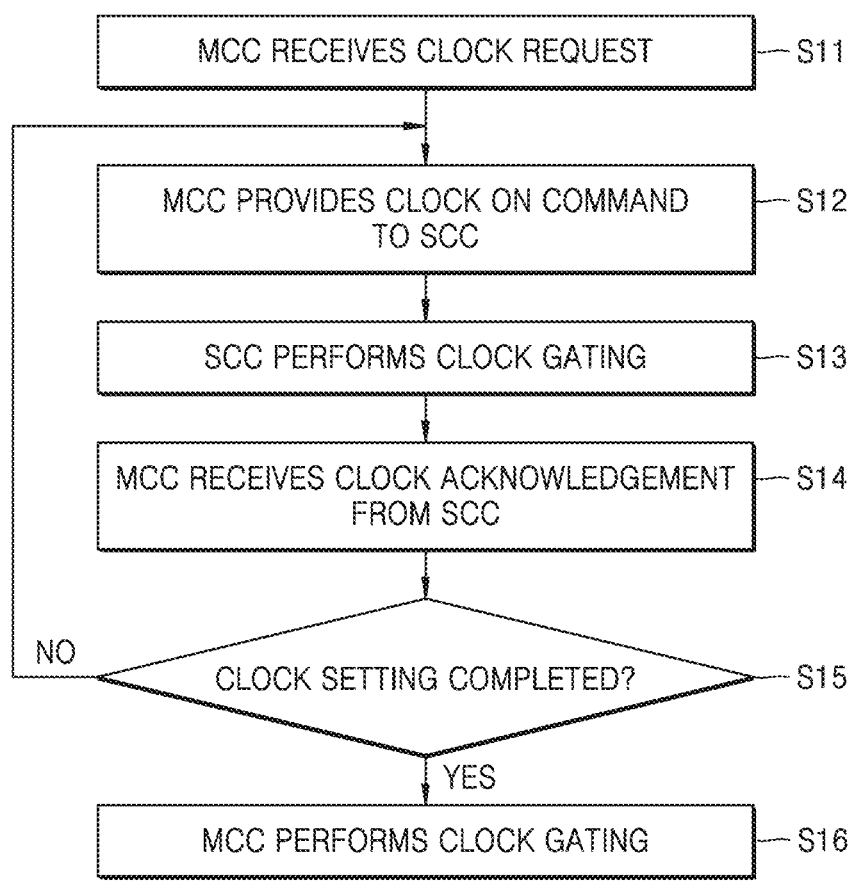
FIG. 11 is a flowchart of a method of operating an SoC, according to an example embodiment of the inventive concepts.

FIG. 11 is a flowchart of a method of operating an SoC, according to an example embodiment of the inventive concepts.

In an identical or similar manner to the example embodiments, a CMU may be provided to an SoC so as to control a clock supply to an interconnect system including one or more functional blocks. A master clock controller and a slave clock controller may be defined with respect to a plurality of clock controllers provided in a CMU according to the configuration of the interconnect system. In addition, the master clock controller may communicate with one or more slave clock controllers through separate channels, and the master clock controller may instruct the clock gating of one or more slave clock controllers through the channels.

As illustrated in FIG. 11, in operation S11, the master clock controller MCC may receive a clock request via software or hardware. The master clock controller MCC may provide a clock on/off command instructing the clock gating of one or more slave clock controllers SCC in response to the clock request. In operation S12, if the received clock request is a request to provide a clock signal to an IP included in an interconnect system, the master clock controller MCC may provide a clock on command to the one or more slave clock controllers SCC.

If a plurality of slave clock controllers SCC are provided in the CMU, the master clock controller MCC may sequentially provide the clock on/off command to the plurality of slave clock controllers SCC. In operation S13, when the master clock controller MCC provides the clock on command to one slave clock controller, for example, the first slave clock controller, then the first slave clock controller SCC may enable the clock signal by performing the clock gating in response to the clock on command. In operation S14, the first slave clock controller SCC may output a clock acknowledgement and the master clock controller MCC may receive the clock acknowledgement.

In operation S15, as all of the slave clock controllers SCC provided in the CMU enable the clock signals, the master clock controller MCC may determine whether the clock setting has been completed. When it is determined in operation S15 that the clock setting has not been completed, the master clock controller MCC may provide the clock on command to another slave clock controller (e.g., the second slave clock controller) that has not enabled the clock signal. For example, the second slave clock controller SCC may enable the clock signal in response to the clock on command and output a clock acknowledgement. The master clock controller MCC may receive the clock acknowledgement, determine whether the clock setting has been completed, and repeat the providing of the clock on command and the receiving of the clock acknowledgement.

In operation S16, when it is determined in operation S15 that the clock setting has been completed, the master clock controller MCC may perform the clock gating to generate the clock signal. In this manner, the clock signals generated by the master clock controller MCC and the slave clock controllers SCC may be provided to the corresponding functional blocks of the interconnect system.

Figure 12:
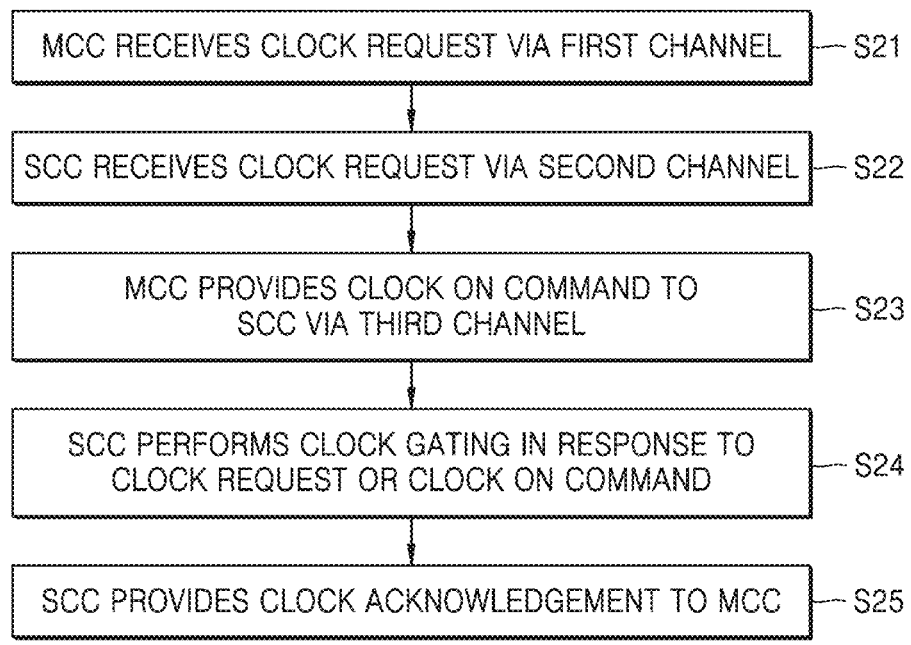
FIG. 12 is a flowchart of a method of operating an SoC, according to another example embodiment of the inventive concepts.

FIG. 12 is a flowchart of a method of operating an SoC, according to another example embodiment of the inventive concepts.

A master clock controller and a slave clock controller may be defined with respect to a plurality of clock controllers provided in a CMU according to the configuration of the interconnect system. A plurality of functional blocks constituting the interconnect system and a plurality of clock controllers provided in the CMU through separate channels may communicate with each other through separate channels. In an identical or similar manner as the above-described example embodiments, the communication may be performed based on a handshake method. For convenience of description, the operation related to one of the slave clock controllers provided in the CMU will be described below.

Referring to FIG. 12, in operation S21, the master clock controller MCC may receive a clock request via software or hardware. For example, the master clock controller MCC may receive a clock request from a first functional block (e.g., an IP) of the interconnect system connected through a first channel via hardware. In operation S22, the slave clock controller SCC may receive a clock request from a second functional block (e.g., an asynchronous bridge, a multiplexer, a bus, etc.) of the interconnect system connected through a second channel.

The master clock controller MCC may be connected to the slave clock controller SCC through a separate channel. For example, the master clock controller MCC may be connected to the slave clock controller SCC through a third channel. In operation S23, the master clock controller MCC may generate one or more control signals for controlling the slave clock control SCC in response to the reception of the clock request. For example, the master clock controller MCC may provide a clock on command to the slave clock controller SCC.

Due to the above-described operation, the slave clock controller SCC may receive two or more signals requesting the clock gating. In operation S24, the slave clock controller SCC may perform the clock gating based on the received signals. For example, the slave clock controller SCC may perform the clock gating based on the earlier received one of the clock request and the clock on command. Alternatively, the slave clock controller SCC may perform the clock gating based on one selected from the clock request and the clock on command. According to another example embodiment, each of the clock request and the clock on command may further include additional information about the clock gating (e.g., priority information, etc.), and the slave clock controller SCC may be controlled to perform the clock gating based on the additional information.

In operation S25, the slave clock controller SCC may provide the functional block of the interconnect system with the clock signal generated based on the clock gating, and the slave clock controller SCC may provide the clock acknowledgement to the master clock controller MCC. Due to the above-described operation, the slave clock controller SCC may be separately controlled regardless of the control of the master clock controller MCC.

Figure 13:
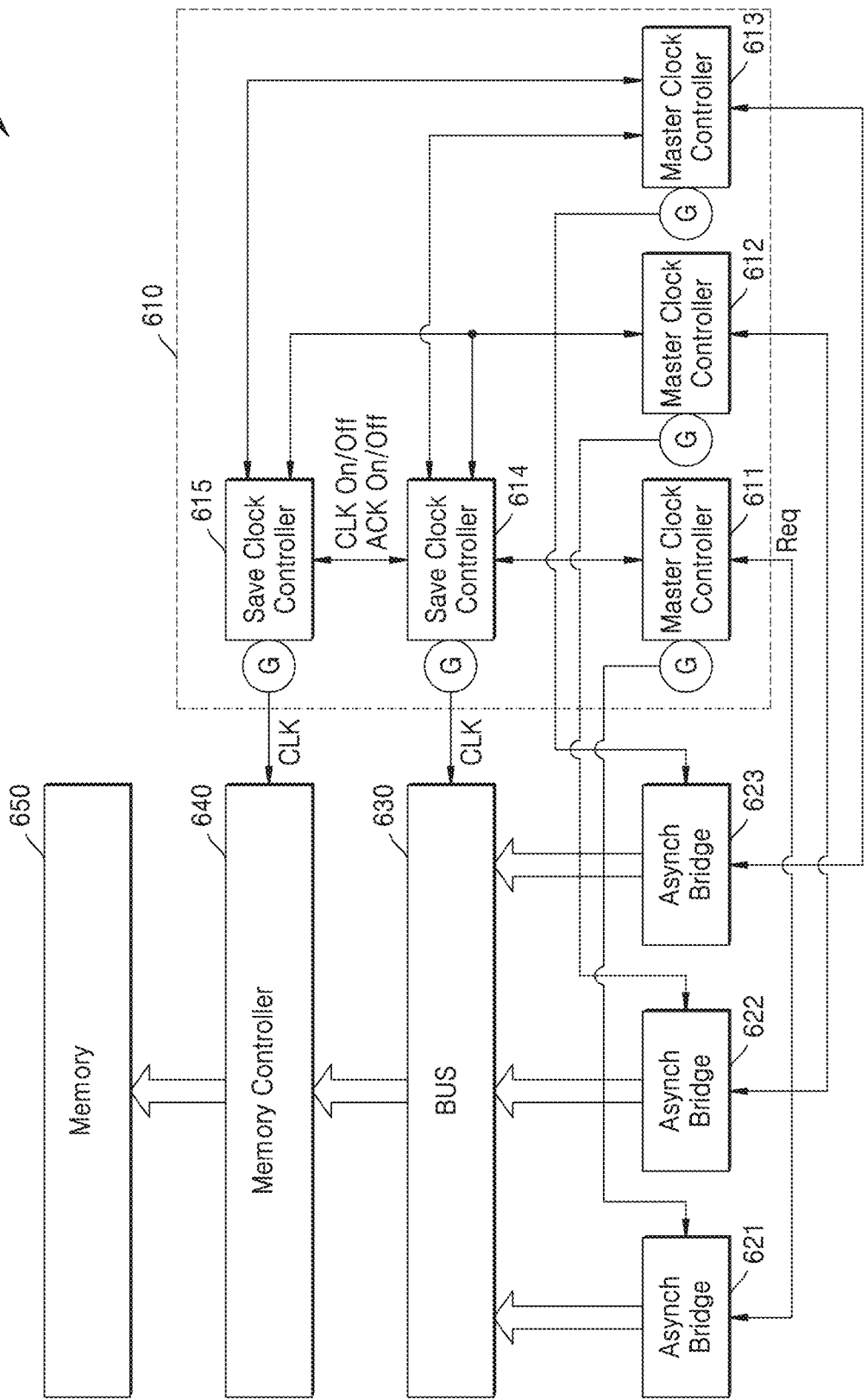
FIG. 13 is a block diagram of an SoC according to another example embodiment of the inventive concepts.

FIG. 13 is a block diagram of an SoC 600 according to another example embodiment of the inventive concepts.

Referring to FIG. 13, the SoC 600 may include a CMU 610 and various functional blocks. In FIG. 13, one or more asynchronous bridges (e.g., first to third asynchronous bridges) 621 to 623, a bus 630, and a memory controller 640 are illustrated as the functional blocks that receive a clock signal CLK from a CMU 610. The memory 650 may be a functional block included in the interconnect system or a functional block disposed outside the interconnect system in the SoC 600. According to another example embodiment, the memory 650 may be a memory device disposed outside the SoC 600. Since specific operations of a channel disposed between the interconnect system and the CMU 610 and a channel disposed between the clock controllers of the CMU 610 in FIG. 13 are identical or substantially similar to those of the above-described example embodiments, detailed descriptions thereof will be omitted.

The functional blocks provided in the interconnect system corresponding to the CMU 610 may be divided into a master functional block and a slave functional block. In the above-described example embodiment, an example in which the IP among the functional blocks is set as the master functional block is illustrated, but the master functional block and the slave functional block may be variously set.

For example, traffic is generated when data is transmitted and received through the system bus, and a functional block in which the traffic is started may be set as the master functional block. Data from the IP may be provided to the asynchronous bridge so as to convert a clock domain. In practice, the asynchronous bridge may correspond to the functional block in which the traffic is started. As illustrated in FIG. 13, the first to third asynchronous bridges 621, 622, and 623 may correspond to the master functional block.

The internal configuration of the CMU 610 may be designed based on the configuration of the interconnect system. For example, the CMU 610 may include first to third master clock controllers 611, 612, and 613 corresponding to the first to third asynchronous bridges 621, 622, and 623. In addition, the CMU 610 may include first and second slave clock controllers 614 and 615 with respect to the bus 630 and the memory controller 640 corresponding to the slave functional blocks of the interconnect system.

According to an example embodiment, each of the first to third asynchronous bridges 621, 622, and 623 may be connected to the IP (not illustrated). When one of the IPs is enabled, the clock signal CLK may be provided to the asynchronous bridge corresponding to the enabled IP, and the providing of the clock signal CLK to the other asynchronous bridges may be blocked. Hereinafter, an example in which the clock signal CLK is provided to the first asynchronous bridge 621 will be described.

When the first synchronous bridge 621 and the first master clock controller 611 are connected to each other through a channel, the first asynchronous bridge 621 may provide the clock request Req to the first master clock controller 611 via hardware. On the other hand, a clock off state may be maintained with respect to the second and third asynchronous bridges 622 and 623.

The first master clock controller 611 that received the clock request Req may sequentially provide the clock on/off command CLK On/Off to the corresponding slave clock controllers 614 and 615 to the bus 630. In addition, the first slave clock controller 614 may provide the clock acknowledgement ACK On/Off to the master clock controller 611 at the same time as providing the clock signal CLK to the bus 630. Furthermore, the second slave clock controller 615 may provide the clock acknowledgement ACK On/Off to the master clock controller 611 at the same time as providing the clock signal CLK to the memory controller 640. When the master clock controller 611 receives the clock acknowledgement ACK On/Off from the first and second slave clock controllers 614 and 615, the master clock controller 611 may perform the clock gating to provide the clock signal CLK to the first asynchronous bridge 621.

Although not illustrated in FIG. 13, in an identical or similar manner to the above-described example embodiments, separate channels may be further disposed between the CMU 610 and the functional blocks of the interconnect system (e.g., the bus 630 and the memory controller 640). According to an example embodiment, the first slave clock controller 614 may be connected to the bus 630 through a separate channel. In addition, according to an example embodiment, the clock request Req from the first asynchronous bridge 621 may be directly provided to the first and second slave clock controllers 614 and 615.

Figure 14:
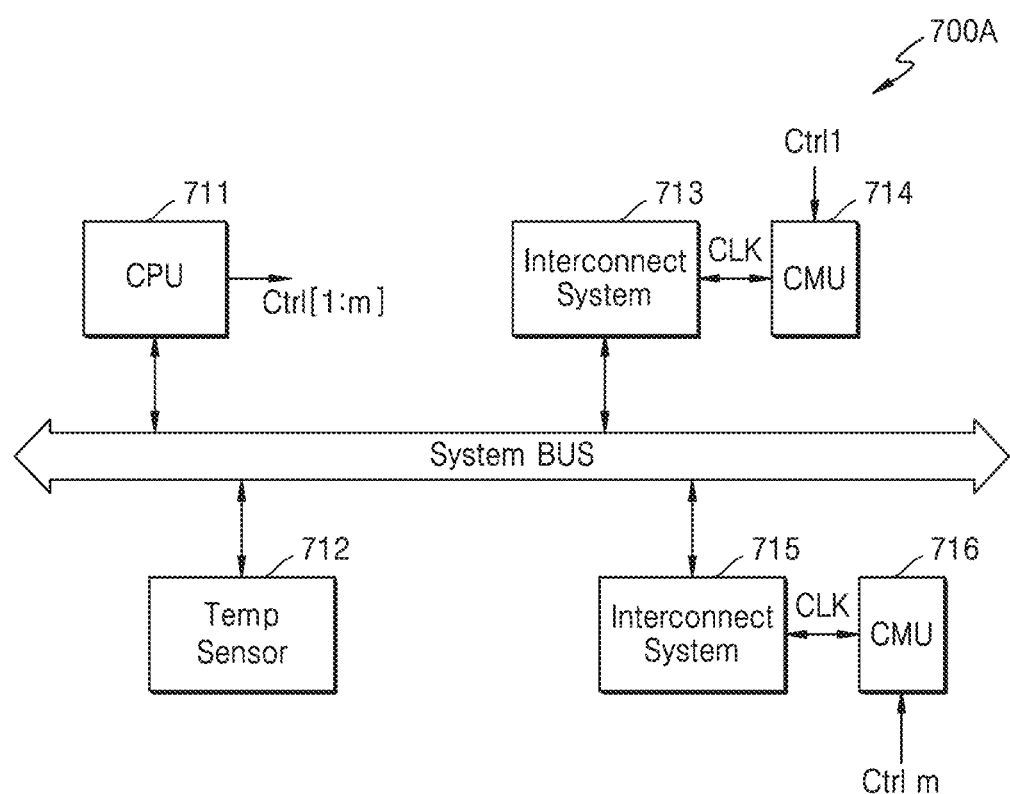
FIG. 14 is a block diagram of an SoC according to another example embodiment of the inventive concepts.

FIG. 14 is a block diagram of an SoC 700A according to another example embodiment of the inventive concepts. Referring to FIG. 14, the SoC 700A may include a CPU 711, a temperature sensor 712, m interconnect systems 713 and 715, and CMUs 714 and 716. The CPU 711 may control the overall operation of the SoC 700A. The temperature sensor 712 may detect an internal temperature of the SoC 700A and generate the temperature detection result. An example in which the interconnect system is arranged corresponding to the CMU is illustrated in FIG. 14, but the arrangement of the interconnection system and the CMU may be variously changed.

The clock signal CLK provided to each functional block provided in the SoC 700A may be adjusted according to the internal temperature of the SoC 700A. According to an example embodiment, the internal temperature of the SoC 700A may increase or decrease according to operating frequencies of the functional blocks of the SoC 700A. In order to protect the internal elements of the SoC 700A, the frequency of the clock signal CLK may be adjusted according to the temperature detection result.

The CPU 711 may control the operating frequencies of the functional blocks in the SoC 700A based on the temperature detection result. According to an example embodiment, the CPU 711 may output a clock control signal Ctrl[1:m] based on the temperature detection result. The clock control signal Ctrl[1:m] may be provided to the CMUs 714 and 716 of the SoC 700A. For example, the first CMU 714 may receive the first control signal Ctrl1 and adjust the frequency of the clock signal CLK provided to the first interconnect system 713 based on the first control signal Ctrl1. When the internal temperature of the SoC 700A increases, the clock signal CLK, the frequency of which is lowered, may be provided to the first interconnect system 713. When the internal temperature of the SoC 700A decreases, the clock signal CLK, the frequency of which is raised, may be provided to the first interconnect system 713. Similarly, the $m^{th}$ CMU 716 may receive the $m^{th}$ control signal Ctrlm and adjust the frequency of the clock signal CLK provided to the $m^{th}$ interconnect system 715 based on the $m^{th}$ control signal Ctrlm.

The interconnect systems 713 and 715 and the corresponding CMUs 714 and 716 illustrated in FIG. 14 may include the elements identical or similar to those described in the above example embodiments. For example, a master clock controller and a slave clock controller may be defined in the CMUs 714 and 716 according to the configurations of the interconnect systems 713 and 715. In addition, it is possible to control the clock gating because the master clock controller and the slave clock controller communicate with each other through a channel via hardware. Furthermore, it is possible to control the clock gating because the functional blocks of the interconnect systems 713 and 715 and the CMUs 714 and 716 communicate with each other through a channel via hardware.

Figure 15:
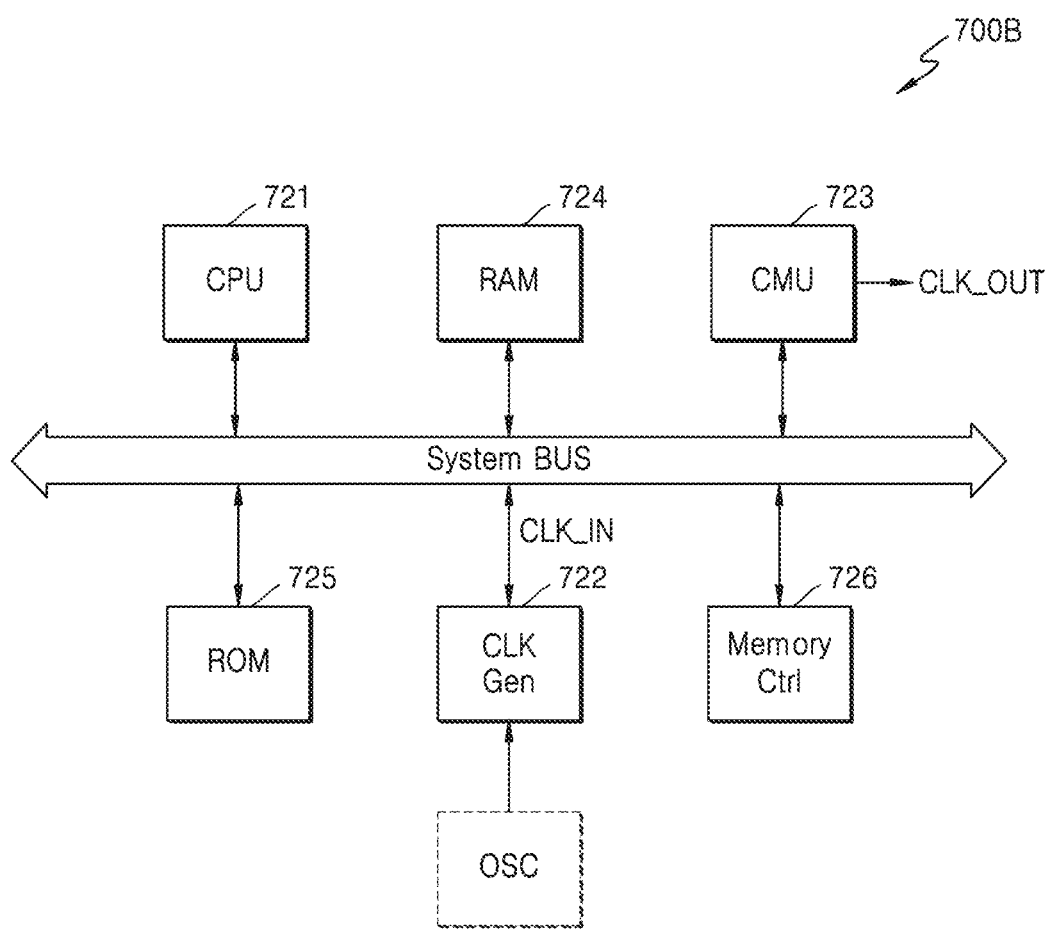
FIG. 15 is a block diagram of an SoC according to another example embodiment of the inventive concepts.

FIG. 15 is a block diagram of an SoC 700B according to another example embodiment of the inventive concepts.

Referring to FIG. 15, the SoC 700B may include a CPU 721, a clock generator 722, a CMU 723, a random access memory (RAM) 724, a read-only memory (ROM) 725, and a memory control unit 726. An oscillator may be disposed outside the SoC 700B to provide an oscillation signal to the SoC 700B. However, this is merely example. The SoC 700B according to the example embodiment of the inventive concepts may include various other functional blocks, and the oscillator may be provided inside the SoC 700B. The SoC 700B of FIG. 15 may be provided in a semiconductor system as an application processor.

The CPU 721, the clock generator 722, the RAM 724, the ROM 725, and the memory control unit 726 may correspond to the functional blocks of the above-described example embodiments. In addition, the interconnect system of the above-described example embodiments may include one or more functional blocks provided in the SoC 700B. One CMU 723 is illustrated in FIG. 15, but a plurality of CMUs corresponding to the functional blocks (or the interconnect systems) of the SoC 700B may be provided in the SoC 700B.

The clock generator 722 may generates a reference clock signal CLK_IN having a reference frequency by using a signal output from the oscillator. The CMU 723 may receive the reference clock signal CLK_IN, generate an operating clock signal CLK_OUT having a desired (or, alternatively a predetermined) frequency, and provide the operating clock signal CLK_OUT to each functional block. According to the above-described example embodiments, the CMU 723 may include one or more master clock controllers and one or more slave clock controllers. Each of the master and slave clock controllers may generate the operating clock signal CLK_OUT by using the reference clock signal CLK. In addition, according to the above-described example embodiments, since the master and slave clock controllers included in the CMU 723 may be connected to each other through a channel or respective channels, it is possible to perform the management of the clock signals via hardware. In addition, since the functional blocks of the master and slave clock controllers provided in the CMU 723 are connected to each other through a channel or the respective channels, it is possible to perform the clock request and the request response via software.

The CPU 721 may process or execute codes and/or data stored in the RAM 724. For example, the CPU 721 may process or execute the codes and/or the data in response to the operating clock output from the CMU 723. The CPU 721 may be implemented as a multi-core processor. The multi-core processor may be a single computing component having two or more independent substantial processors, and each of the processors may read and execute program instructions. Since the multi-core processor is capable of simultaneously driving a plurality of accelerators, a data processing system including the multi-core processor is capable of executing multi-accelerations.

The RAM 724 may temporarily store program codes, data, or instructions. For example, program codes and/or data stored in an internal or external memory (not illustrated) may be temporarily stored in the RAM 724 according to the control of the CPU or booting code stored in the ROM 725. The memory control unit 726 is a block for interfacing with the internal or external memory. The memory control unit 726 may control the overall operation of the memory, or may control data exchange between a host and the memory.

Figure 16:
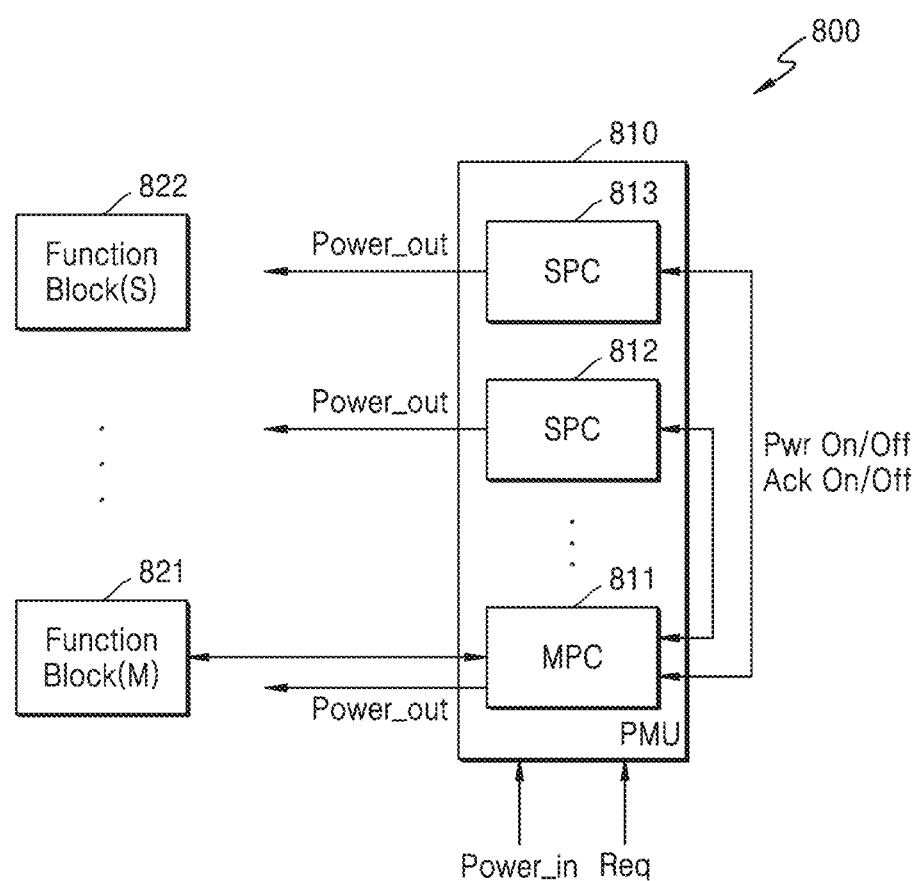
FIG. 16 is a block diagram of an SoC according to another example embodiment of the inventive concepts.

FIG. 16 is a block diagram of an SoC 800 according to another example embodiment of the inventive concepts.

Specifically, FIG. 16 illustrates an example in which the SoC 800 includes a power management unit (PMU) 810 configured to manage power provided to the functional blocks. In an identical or similar manner to the CMU for managing clock signals in the above-described example embodiments, the PMU 810 may be designed to manage power used in the SoC 800.

The SoC 800 may include the PMU 810 and a plurality of functional blocks 821 and 822. The functional blocks 821 and 822 may be divided into a master functional block 821 and a slave functional block 822. For operation of the master functional block 821, power is provided to the master functional block 821 and power is provided to one or more slave functional blocks 822 associated with the operation of the master functional block 821. Similar to the above-described example embodiments, the master functional block 821 and the slave functional block 822 may constitute one interconnect system.

The PMU 810 may be provided corresponding to the interconnect system. The PMU 810 may include a master power controller (MPC) 811 and one or more slave power controllers (SPCs) 812 and 813. The PMU 810 may communicate with the functional blocks of the interconnect system through one or more channels. An example in which the master functional block 821 communicates with the MPC 811 through a channel based on a handshake method is illustrated in FIG. 16.

The MPC 811 may communicate with each of the SPCs 812 and 813 through respective channels. The PMU 810 may receive input power Power_in and generate output power Power_out by adjusting the input power Power_in to a power suitable for each functional block. In addition, the PMU 810 may allow or block the providing of the power to the master functional block 821 and the slave functional block 822 in response to a power request Req. In an identical or similar manner to the above-described example embodiments, the MPC 811 may receive the power request Req via software based on code processing of a CPU (not illustrated), or may receive the power request Req from the master functional block 821 via hardware. The master functional block 821 may provide a power on/off command Pwr On/Off to the SPCs 812 and 813 and may receive a power acknowledgement Ack On/Off from the SPCs 812 and 813.

Figure 17:
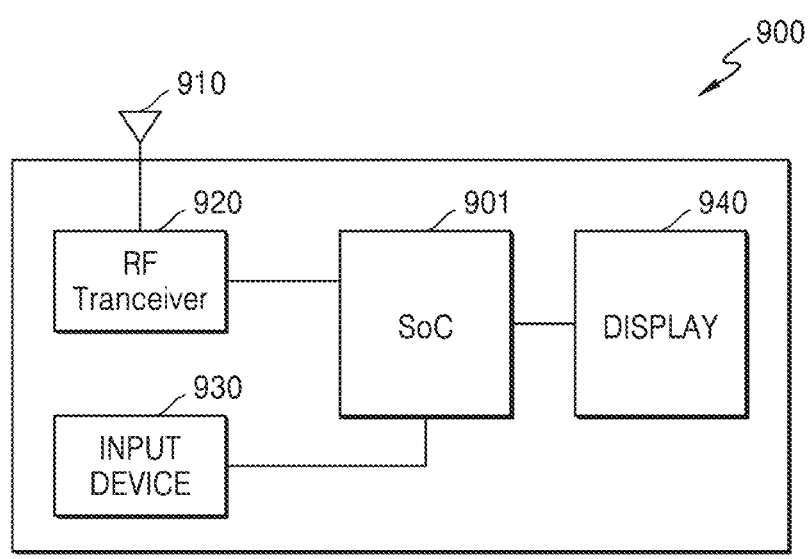
FIG. 17 is a block diagram of a semiconductor system including an SoC, according to an example embodiment of the inventive concepts.

FIG. 17 is a block diagram of a semiconductor system 900 according to an example embodiment of the inventive concepts.

Referring to FIG. 17, the semiconductor system 900 may include an SoC 901, an antenna 910, a radio frequency (RF) transceiver 920, an input device 930, and a display 940. The SoC 901 may be any one of the SoCs according to the above-described example embodiments. The RF transceiver 920 may transmit and receive an RF signal through the antenna 910. For example, the RF transceiver 920 may convert an RF signal received through the antenna 910 into a signal capable of being processed in the SoC 901. Therefore, the SoC 901 may process a signal output from the RF transceiver 920 and transmit the processed signal to the display 940. In addition, the RF transceiver 920 may convert a signal output from the SoC 901 into an RF signal and output the RF signal to an external device through the antenna 910. The input device 930 is a device configured to receive a control signal to be used for controlling the operation of the SoC 901 or data to be processed by the SoC 901. Examples of the input device 903 may include a pointing device, such as a touch pad or a computer mouse, a keypad, and a keyboard.

Figure 18:
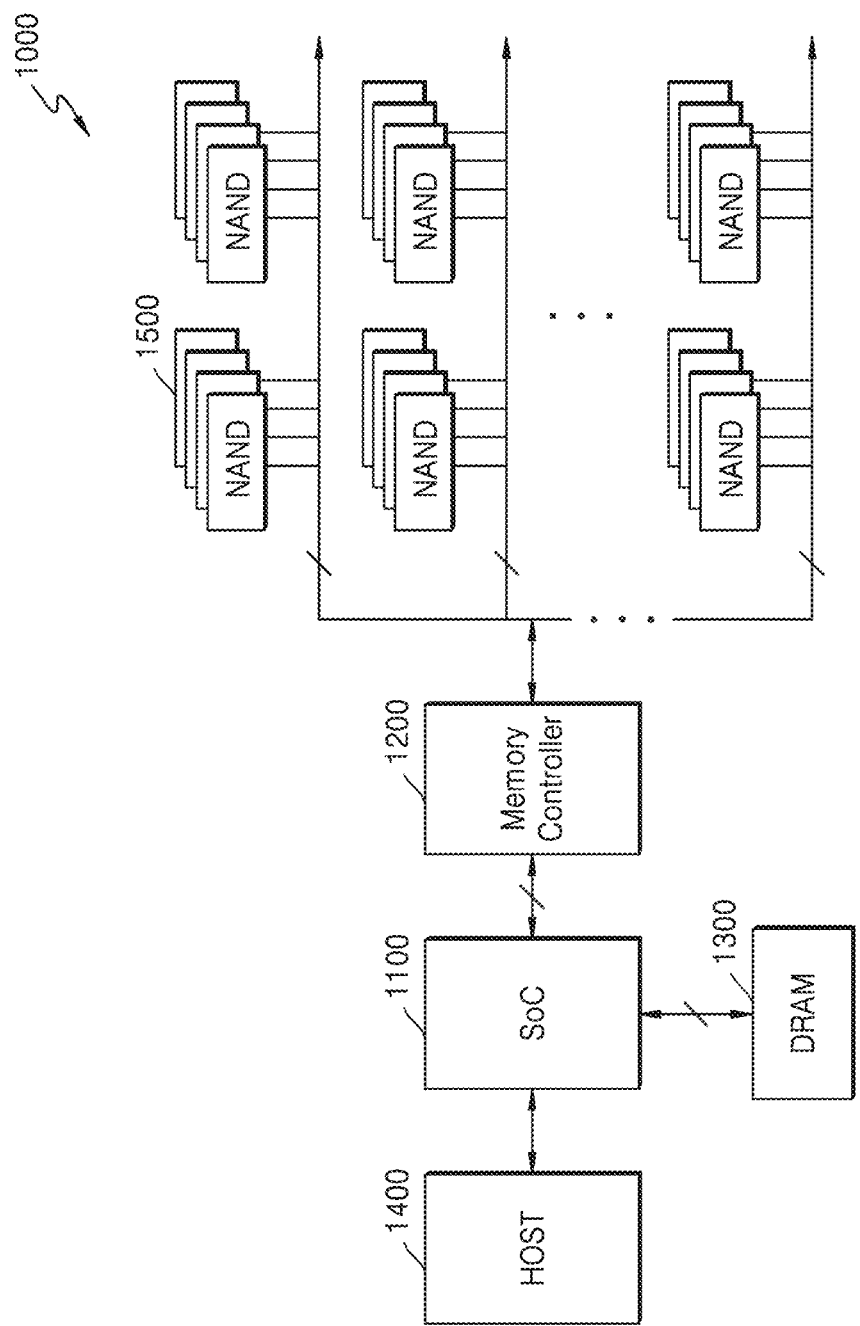
FIG. 18 is a block diagram of a semiconductor system including an SoC, according to another example embodiment of the inventive concepts.

FIG. 18 is a block diagram of a semiconductor system 1000 according to another example embodiment of the inventive concepts.

Referring to FIG. 18, the semiconductor system 1000 may be a data processor such as a solid state drive (SSD). The semiconductor system 1000 may include a plurality of memory devices 1500, a memory controller 1200 configured to control data processing operations of the memory devices 1500, a non-volatile memory device 1300 such as DRAM, and an SoC 1100 configured to control storing of data exchanged between the memory controller 1200 and a host 1400 in the non-volatile memory device 1300. The SoC 1100 may be as described any of in the above example embodiments. Accordingly, the SoC 1100 may include a CMU (and/or a PMU) corresponding to the configuration of the interconnect system. Thus, the CMU may include a master clock controller and a slave clock controller.

According to the example embodiments of the inventive concepts, since the master/slave clock controllers of the CMU are designed based on the master/slave configuration of the interconnect system, it is possible to perform efficient clock management with respect to the interconnect system.

In addition, according to the example embodiments of the inventive concepts, since the output of the clock signal is controlled according to a hardware based method, it is possible to reduce the probability of occurrence of an error and also reduce the latency for enabling the clock signals, as compared to the software-based management of the clock signals.

Furthermore, according to the example embodiments of the inventive concepts, since routines of the OS and the firmware are reduced, it is possible to reduce the number of software codes. Moreover, it is possible to reduce power consumption by simplifying the gate structure for controlling the clock signals.

While the inventive concepts has been particularly shown and described with reference to example embodiments thereof, it will be understood that various changes in form and details may be made therein without departing from the spirit and scope of the following claims.

What is claimed is:

1. A system on chip (SoC) comprising:
a first intellectual property (IP) of the SoC configured to generate a first clock request;
a second IP of the SoC configured to generate a second clock request;
a first slave clock controller of the SoC;
a second slave clock controller of the SoC; and
a master clock controller of the SoC configured to provide a command to both the first slave clock controller via a first channel and the second slave clock controller via a second channel, in response to either the first clock request or the second clock request,
wherein the first slave clock controller is configured to perform a clock operation in response to the command and to provide a first clock acknowledgement to the master clock controller,
the second slave clock controller is configured to perform the clock operation in response to the command and to provide a second clock acknowledgement to the master clock controller, and
in response to the first clock acknowledgement and the second clock acknowledgement, the master clock controller is configured to perform the clock operation and to provide a first clock signal to the first IP and/or to the second IP.

2. The SoC of claim 1, wherein the first slave clock controller outputs a second clock signal, and the second slave clock controller outputs a third clock signal.

3. The SoC of claim 2, wherein the second clock signal is the same as the third clock signal.

4. The SoC of claim 2, wherein the second clock signal is different from the third clock signal.

5. The SoC of claim 2, further comprising:
an asynchronous bridge configured to exchange data between the first IP and the second IP;
a multiplexer configured to receive a first signal from the first IP and a second signal from the second IP; and
a bus configured to receive an output of the multiplexer.

6. The SoC of claim 5, wherein
the asynchronous bridge receives the second clock signal, and
the multiplexer receives the third clock signal.

7. The SoC of claim 2, wherein after the first slave clock controller outputs the second clock signal and the second slave clock controller outputs the third clock signal, the master clock controller outputs the first clock signal.

8. The SoC of claim 1, wherein at least one of the first IP and the second IP is a master IP.

9. A system on chip (SoC) comprising:
a first intellectual property (IP) of the SoC configured to generate a first clock request;
a second IP of the SoC configured to generate a second clock request;
a first slave clock controller of the SoC;
a second slave clock controller of the SoC;
a first master clock controller configured of the SoC to provide a first command to both the first slave clock controller via a first channel and the second slave clock controller via a second channel, in response to the first clock request; and
a second master clock controller of the SoC configured to provide a second command to both the first slave clock controller via a third channel and the second slave clock controller via a fourth channel, in response to the second clock request,
wherein the first slave clock controller is configured to perform a first clock operation in response to the first command and to provide a first clock acknowledgement to the first master clock controller,
the second slave clock controller is configured to perform the first clock operation in response to the first command and to provide a second clock acknowledgement to the first master clock controller,
in response to the first clock acknowledgement and the second clock acknowledgement, the first master clock controller is configured to perform the first clock operation and to provide a first clock signal to the first IP,
the first slave clock controller is configured to perform a second clock operation in response to the second command and to provide a third clock acknowledgement to the second master clock controller,
the second slave clock controller is configured to perform the second clock operation in response to the second command and to provide a fourth clock acknowledgement to the second master clock controller, and
in response to the third clock acknowledgement and the fourth clock acknowledgement, the second master clock controller is configured to perform the second clock operation and to provide a second clock signal to the second IP.

10. The SoC of claim 9, wherein the first slave clock controller outputs a third clock signal, and the second slave clock controller outputs a fourth clock signal.

11. The SoC of claim 10, further comprising:
a multiplexer configured to receive a first signal from the first IP and a second signal from the second IP; and
a bus configured to receive an output of the multiplexer.

12. The SoC of claim 11, wherein
the multiplexer receives the third clock signal, and
the bus receives the fourth clock signal.

13. The SoC of claim 10, wherein the third clock signal is the same as the fourth clock signal.

14. The SoC of claim 10, wherein the third clock signal is different from the first clock signal.

15. The SoC of claim 9, wherein each of the first IP and the second IP is a master IP.

16. A system comprising:
a memory;
a memory controller configured to control an operation of the memory;
a first IP of an SoC;
a second IP of the SoC;
a first slave clock controller of the SoC;

a second slave clock controller of the SoC; and a master clock controller of the SoC configured to provide a command to both the first slave clock controller and the second slave clock controller in response to a clock request, wherein the first slave clock controller is configured to output a first clock signal in response to the command and to provide a first clock acknowledgement to the master clock controller, the second slave clock controller is configured to output a second clock signal in response to the command and to provide a second clock acknowledgement to the master clock controller, and in response to the first clock acknowledgement and the second clock acknowledgement, the master clock controller is configured to output a third clock signal to the first IP and/or the second IP.

17. The system of claim 16, wherein the first slave clock controller provides the first clock signal to the memory, and the second slave clock controller provides the second clock signal to the memory controller.

18. The system of claim 16, wherein either the first IP or the second IP provides the clock request to the master clock controller.

19. The system of claim 16, wherein the third clock signal is different from the first clock signal and different from the second clock signal.

20. The system of claim 16, wherein the first clock signal is the same as the second clock signal.

* * * * *